US010540126B2

(12) United States Patent
Maruyama et al.

(10) Patent No.: US 10,540,126 B2
(45) Date of Patent: Jan. 21, 2020

(54) IMAGE PROCESSING DEVICE, IMAGE PROCESSING SYSTEM AND NON-TRANSITORY RECORDING MEDIUM WITH COMMUNICATION-BASED ACCESS CONTROL

(71) Applicant: KONICA MINOLTA, INC., Chyoda-ku, Tokyo (JP)

(72) Inventors: Tomoko Maruyama, Toyokawa (JP); Hideyuki Matsuda, Hirakata (JP); Kaoru Fukuoka, Toyokawa (JP); Jun Shiraishi, Toyokawa (JP); Hiroyuki Ohno, Toyokawa (JP); Eisaku Owada, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/025,941

(22) Filed: Jul. 2, 2018

(65) Prior Publication Data
US 2019/0042168 A1 Feb. 7, 2019

(30) Foreign Application Priority Data

Aug. 1, 2017 (JP) .................................. 2017-148829

(51) Int. Cl.
G06F 3/12 (2006.01)
H04L 29/06 (2006.01)
(52) U.S. Cl.
CPC .......... *G06F 3/1222* (2013.01); *G06F 3/1207* (2013.01); *G06F 3/1238* (2013.01);
(Continued)
(58) Field of Classification Search
CPC .... G06F 3/1222; G06F 3/1238; G06F 3/1259; G06F 3/1207; G06F 3/1292; H04L 63/18;
(Continued)

(56) References Cited

U.S. PATENT DOCUMENTS

2009/0150794 A1 6/2009 Sano
2013/0141749 A1* 6/2013 Chiba .................. H04N 1/4406
358/1.14
(Continued)

FOREIGN PATENT DOCUMENTS

JP 2009141705 A 6/2009
JP 2015149623 A 8/2015
JP 2016058778 A 4/2016

OTHER PUBLICATIONS

Chinese Office Action (and English language translation thereof) dated Jul. 29, 2019 issued in counterpart Chinese Application No. 201810863574.X.

*Primary Examiner* — Kent Yip
(74) *Attorney, Agent, or Firm* — Holtz, Holtz & Volek PC

(57) ABSTRACT

An image processing device that provides an operation terminal device with an operation screen and receives input information from the operation terminal device, comprising a hardware processor that: communicates with the operation terminal device in either a first communication mode or a second communication mode, which is different from the first communication mode; determines whether the communication with the operation terminal device is in the first communication mode or the second communication mode; and creates a first screen, which is the operation screen imposed with no limit, and provides the operation terminal device with the created first screen when the communication is determined to be made in the first communication mode, and creates a second screen, which is the operation screen imposed with a limit, and provides the operation terminal device with the created second screen when the communication is determined to be made in the second communication mode.

21 Claims, 19 Drawing Sheets

(52) U.S. Cl.
CPC .......... *G06F 3/1259* (2013.01); *G06F 3/1292* (2013.01); *H04L 63/18* (2013.01); *H04L 63/0428* (2013.01); *H04L 2209/80* (2013.01)

(58) Field of Classification Search
CPC ............ H04L 63/0428; H04L 2209/80; H04N 2201/0075; H04N 1/0048
See application file for complete search history.

(56) References Cited

U.S. PATENT DOCUMENTS

2016/0011830 A1* 1/2016 Asakura ................ H04W 76/10
 358/1.15
2016/0070510 A1 3/2016 Iwase

* cited by examiner

FIG. 8A
FIRST SCREEN (NO LIMIT)

PLEASE SELECT ITEM TO SET.

MENU

55 — REGISTER ADDRESS/BOX

56 — USER SETTING

57 — ADMINISTRATOR SETTING

58 — CLOSE

FIG. 8B
SECOND SCREEN (WITH LIMIT)

PLEASE SELECT ITEM TO SET.

MENU

55 — REGISTER ADDRESS/BOX

56 — USER SETTING

57 — [ ]

58 — CLOSE

FIRST SCREEN (NO LIMIT)

SECOND SCREEN (WITH LIMIT)

ENCRYPTION COMMUNICATION

DA1 — FIRST SCREEN (SSL COMMUNICATION)

NON-ENCRYPTION COMMUNICATION

DA2 — SECOND SCREEN (NON-SSL COMMUNICATION)

IMAGE PROCESSING DEVICE, IMAGE PROCESSING SYSTEM AND NON-TRANSITORY RECORDING MEDIUM WITH COMMUNICATION-BASED ACCESS CONTROL

The entire disclosure of Japanese patent application No. 2017-148829 filed on Aug. 1, 2017, is incorporated herein by reference in its entirety.

BACKGROUND

Technological Field

The present invention relates to an image processing device, an image processing system and a non-transitory recording medium. The present invention more specifically relates to a technique for an operation terminal device to remotely operate an image processing device.

Description of the Related Art

Operation screens displayed on operational panels of conventional image processing devices such as MFPs (Multifunction Peripherals) are sent to operation terminal devices over a network and the operation screens are displayed on the operation terminal devices so that the operation terminal devices may remotely operate the image processing devices. This known technique is introduced for example in Japanese Patent Application Laid-Open No. JP 2016-58778 A.

Communications between the image processing device and the operation terminal device are not always wired communications. The communications may be wireless communications. If the operation terminal device is one of smartphones or tablet terminals, for instance, the operation terminal device may perform wireless communications with the image processing device.

For the wireless communication using WiFi, for example, communication radio wave may be propagated outside an office. If the operation screens are provided to the operation terminal device from the image processing device and the operation terminal device performs wireless communication to send input information based on a user input to the image processing device, information such as screen information and/or the input information may be intercepted and wiretapped by third parties.

The screen information provided from the image processing device to the operation terminal device may include document image for preview of document data, for instance. If the document data contains confidential information, the confidential information may be leaked out. A password may be set for the document data containing the confidential information. In this case, if the input information sent to the image processing device from the operation terminal device is intercepted, the password may be leaked out.

As described above, the aforementioned known technique has a problem that may lead leakage of the confidential information depending on the communication mode between the image processing device and the operation terminal device, and is undesirable in view of security.

SUMMARY

The present invention is intended to solve the above problem. Thus, the present invention is intended to provide an image processing device, an image processing system and a non-transitory recording medium capable of preventing leakage of confidential information to outside and realizing remote operation with a high security level.

First, the present invention is directed to an image processing device that provides an operation terminal device with an operation screen and receives input information from the operation terminal device.

To achieve at least one of the abovementioned objects, according to an aspect of the present invention, the image processing device reflecting one aspect of the present invention comprises a hardware processor that: communicates with the operation terminal device in either a first communication mode or a second communication mode, which is different from the first communication mode; determines whether the communication with the operation terminal device is in the first communication mode or the second communication mode; and creates a first screen, which is the operation screen imposed with no limit, and provides the operation terminal device with the created first screen when the communication is determined to be made in the first communication mode, and creates a second screen, which is the operation screen imposed with a limit, and provides the operation terminal device with the created second screen when the communication is determined to be made in the second communication mode.

Second, the present invention is directed to an image processing system.

To achieve at least one of the abovementioned objects, according to an aspect of the present invention, the image processing system reflecting one aspect of the present invention comprises an image processing device according to claim 1; and an operation terminal device capable of communicating with the image processing device in the first communication mode or the second communication mode. The operation terminal device includes: a display on which a first screen or a second screen provided by the image processing device is displayed; and a hardware processor that: detects a user input; and transmits input information every time the single input is detected while the first screen is displayed on the display, and stores the detected input while the second screen is displayed on the display unit and transmits the input information based on the stored input at the time when the screen displayed on the display unit is switched to the first screen from the second screen.

Third, the present invention is directed to a non-transitory recording medium storing a computer readable program to be executed by a hardware processor in an image processing device that provides an operation terminal device with an operation screen and receives input information from the operation terminal device.

To achieve at least one of the abovementioned objects, according to an aspect of the present invention, the non-transitory recording medium reflecting one aspect of the present invention stores the computer readable program, execution of the computer readable program by the hardware processor in the image processing device causing the hardware processor in the image processing device to perform: communicating with the operation terminal device in either a first communication mode or a second communication mode, which is different from the first communication mode; determining whether the communication with the operation terminal device is in the first communication mode or the second communication mode; and creating a first screen, which is the operation screen imposed with no limit, and providing the operation terminal device with the created first screen when the communication is determined to be made in the first communication mode, and creating a second screen, which is the operation screen imposed with a limit, and providing the operation terminal device with the created second screen when the communication is determined to be made in the second communication mode.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIGS. 8A and 8B illustrate an example of a setting menu screen;

DETAILED DESCRIPTION OF EMBODIMENTS

Hereinafter, one or more embodiments of the present invention will be described with reference to the drawings. However, the scope of the invention is not limited to the disclosed embodiments.

First Preferred Embodiment

Figure 1:
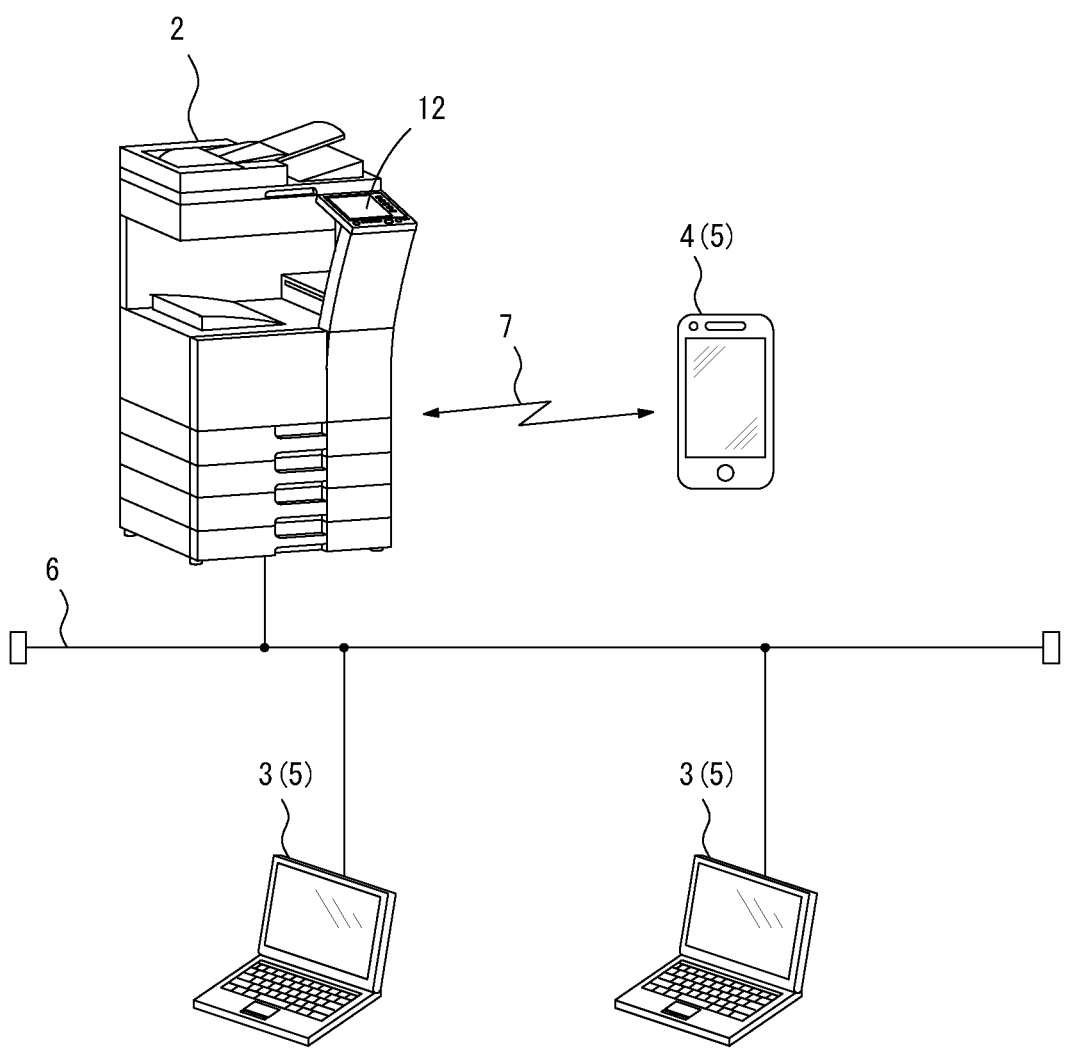
FIG. 1 illustrates an exemplary configuration of an image processing system in which a first preferred embodiment may be practiced.

FIG. 1 illustrates an exemplary configuration of an image processing system 1 in which the first preferred embodiment of the present invention may be practiced. The image processing system 1 is a network system installed in places such as an office, for example, which includes an image processing device 2, an information processing device 3 and a portable terminal device 4.

The image processing device 2 may be one of MFPs including functions such as a print function, a scan function, a fax function and/or a box function, for instance. The image processing device 2 may process a job specified by a user such as a print job and/or a scan job. An operational panel 12 is provided at a front side of the main body of the image processing device 2. The operational panel 12 is a user interface for a user to use the image processing device 2. The image processing device 2 displays various types of operation screens on the operational panel 12 to receive inputs by the user.

The information processing device 3 is formed from a personal computer, for example. The information processing device 3 may communicate with the image processing device 2 over a network 6 such as LAN (Local Area Network). The network 6, for example, enables wired communication over a LAN cable. The network 6 may include wireless communication network.

The portable terminal device 4 is formed from a smartphone or a tablet terminal, for example. The portable terminal device 4 may make wireless communication 7 with the image processing device 2. Besides the wireless communication 7, the portable terminal device 4 may make wired communication with the image processing device 2 by connecting a LAN cable to the network 6, for example.

Each of the aforementioned information processing device 3 and the portable terminal device 4 has an application to work together with the image processing device 2 installed in advance. When the application is started, each of the information processing device 3 and the portable terminal device 4 starts communication with the image processing device 2 to serve as an operation terminal device 5 to remotely operate the image processing device 2. The image processing device 2 makes wired communication or wireless communication to send the operation screen to display on the operational panel 12 to the operation terminal device 5. The operation terminal device 5 displays the operation screen received from the image processing device 2 and receives an input by the user on the operation screen. The operation terminal device 5 sends input information based on the user input to the image processing device 2, and remotely operates the image processing device 2. The image processing system 1 is explained more in detail below. The information processing device 3 and the portable terminal device 4 are collectively called as the operation terminal device 5 hereafter.

Figure 2:
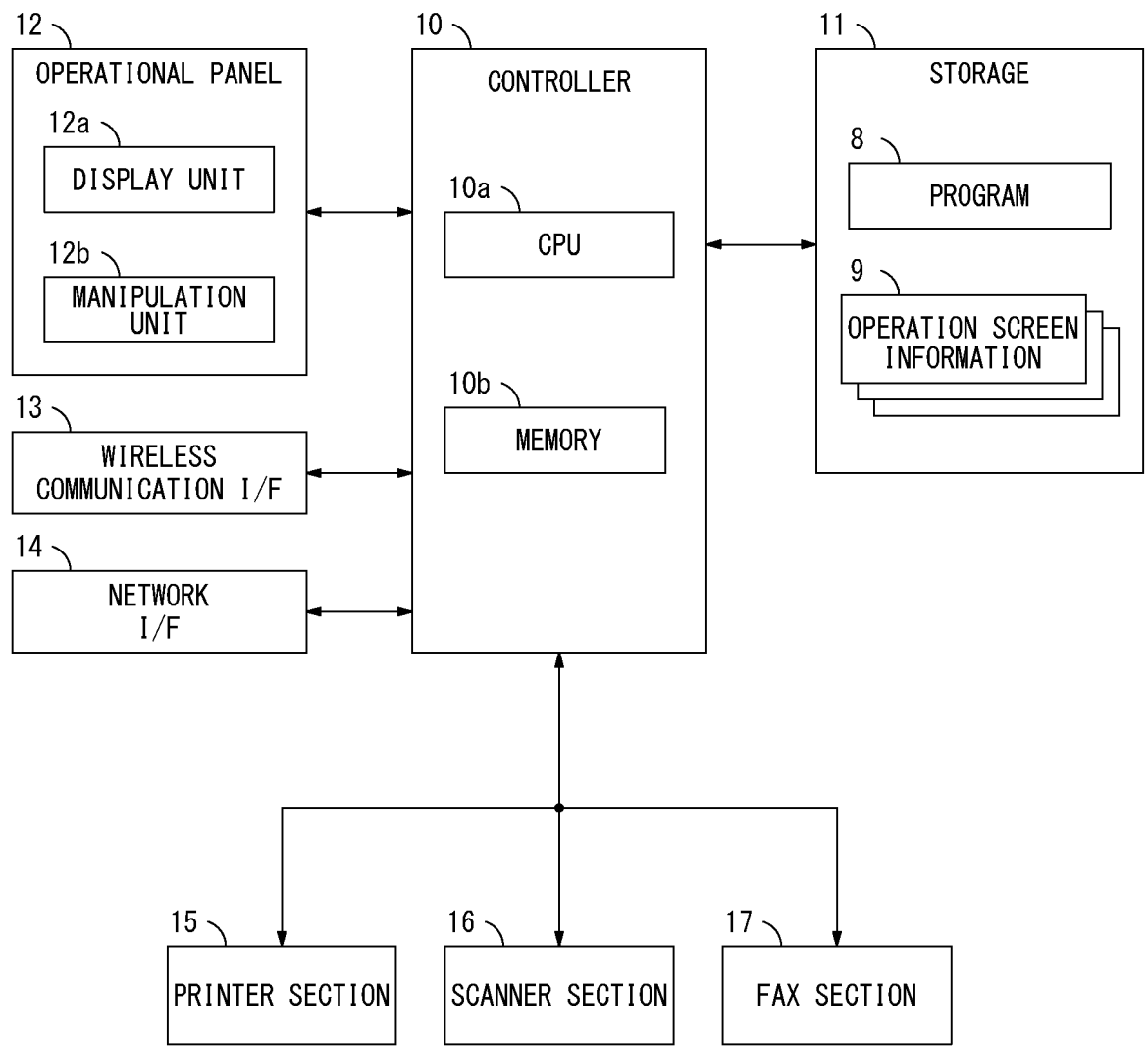
FIG. 2 illustrates a block diagram showing an example of a hardware structure of an image processing device.

FIG. 2 illustrates a block diagram showing an example of a hardware structure of the image processing device 2. The image processing device 2 includes a controller 10, a storage 11, the operational panel 12, a wireless communication interface 13, a network interface 14, a printer section 15, a scanner section 16 and a fax section 17.

The controller 10 may include a CPU 10a and a memory 10b. The CPU 10 controls operation of each part of the image processing device 2. The CPU 10a is a hardware processor that reads and executes a program 8 stored in the storage 11. The memory 10b stores temporary data generated when the CPU 10a executes the program 8.

The storage 11 is formed from a non-volatility device such as a hard disk drive (HDD) or a solid state drive (SSD), for example. The program 8 executed by the CPU 10a of the controller 10 is stored in the storage 11. The program 8 stored in a computer readable storage medium such as a CD-ROM or a DVD-ROM, for example, is distributed, then installed in the image processing device 2. The program 8 may be provided over an internet, and the image processing device 2 may download from the internet to install.

Operation screen information 9 is stored in advance in the storage 11. The operation screen information 9 relates to various types of operation screens displayed on a display unit 12a of the operational panel 12. The operation screen information 9 is generated for each respective screen displayed on the display unit 12a and stored in the storage 11. A series of inputs associating multiple operation screens may be received, for example. In such a case, the operation screen information 9 that arranges the multiple screens may be stored in the storage 11. The operation screen information 9 includes screen information defining screen structure that displays confidential information and/or screen information defining structure that displays only non-confidential information.

The operational panel 12 includes the display unit 12a and a manipulation unit 12b. Various types of information is displayed on the display unit 12a to the user. The manipulation unit 12b receives user inputs. The display unit 12a is constructed by a device such as a color liquid crystal display, for instance. The operation screen based on the operation screen information 9 is displayed on the display unit 12a. The manipulation unit 12b is constructed by parts such as touch panel keys arranged on the display area of the display unit 12a and/or push-button keys arranged on the display area of the display unit 12a. Once the user touches the surface of the screen of the display unit 12a, for example, the manipulation unit 12b detects a position touched by the user on the screen. The manipulation unit 12b then outputs the input information showing the touching position to the controller 10.

The wireless communication interface 13 makes wireless communication with the operation terminal device 5. The wireless communication interface 13 makes wireless communication with the operation terminal device 5 based on a protocol such as near distance radio communication (NFC: Near Field Communication), Bluetooth (registered trademark) or WiFi. The wireless communication interface 13 may make wireless communication with the single operation terminal device 5 or with the multiple operation terminal devices 5 at the same time.

The network interface 14 is an interface that connects to the LAN cable so that it enables the image processing device 2 to connect to the network 6 to make wired communication with the operation terminal device 5. The network interface 14 makes wired communication with the operation terminal device 5 based on a protocol such has TCP/IP, for instance.

The printer section 15 is driven by the controller 10 for execution of the print job at the image processing device 2. The printer section 15 transfers toner image based on the image data subjected to printing to a printing sheet, and forms the image. The scanner section 16 is driven by the controller 10 for execution of the scan job at the image processing device 2. The scanner section 16 optically reads a document placed by the user and constructs image data. The fax section 17 is driven by the controller 10 for transmission and receipt of fax data at the image processing device 2. The fax section 17 transmits and receives fax data over public phone lines, which are not shown in figures.

Figure 3:
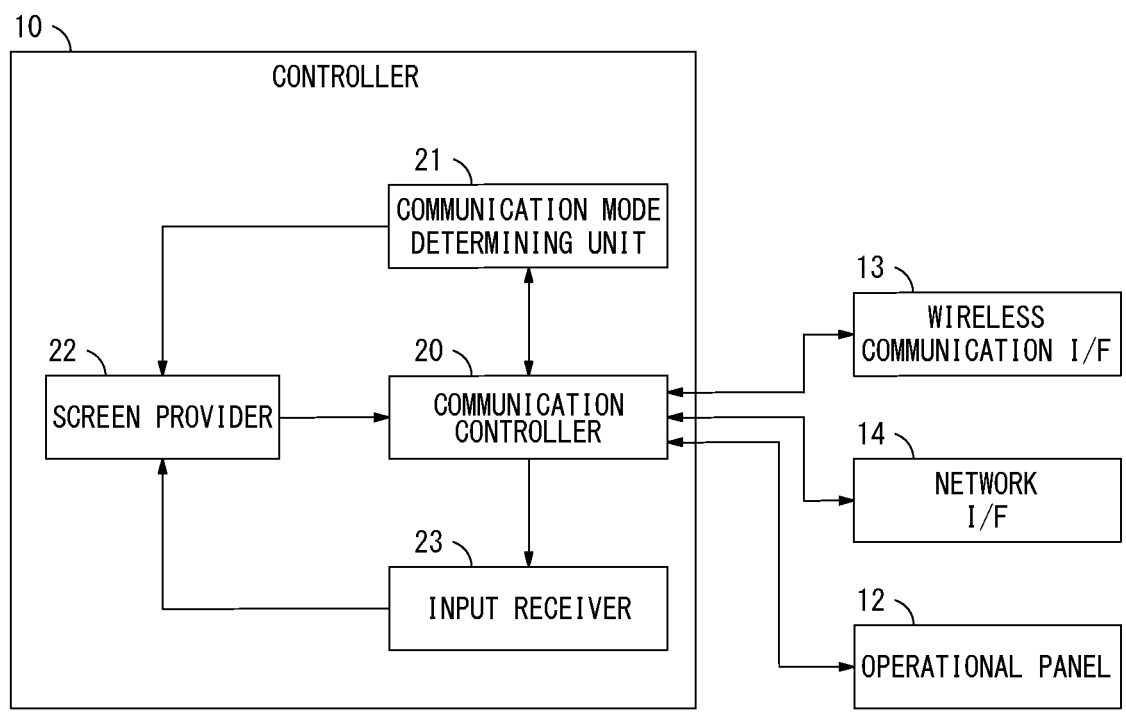
FIG. 3 is a block diagram showing an example of a functional structure of the image processing device.

A functional structure of the controller 10 of the image processing device 2 is explained next. FIG. 3 is a block diagram showing an example of a functional structure of the controller 10. The CPU 10a executes the program 8 so that the controller 10 serves as a communication controller 20, a communication mode determining unit 21, a screen provider 22 and an input receiver 23. Only the parts necessary for enabling the image processing device 2 to work together with the operation terminal device 5 is illustrated in FIG. 3.

The communication controller 20 controls communication with the operation terminal device 5 via the wireless communication interface 13 or the network interface 14. More specifically, the communication controller 20 may make wireless communication with the operation terminal device 5 via the wireless communication interface 13 or wired communication with the operation terminal device 5 via the network interface 14. The communication controller 20 controls communication with the operational panel 12 over an internal network of the image processing device 2.

The communication mode determining unit 21 determines the communication mode in which the communication controller 20 communicates with each of the respective operation terminal device 5 and the operational panel 12. There are two communication modes, the first communication mode and the second communication mode for communicating with each of the respective operation terminal device 5 and the operational panel 12. The first communication mode has high security ensuring a predetermined security level. The second communication mode has lower security than the first communication mode. The communication mode determining unit 21 determines whether the communication with each of the respective operation terminal device 5 and the operational panel 12 is in the first communication mode or the second communication mode.

The communication made by the communication controller 20 with the operational panel 12 is performed over the internal network of the image processing device 2. Hence, the information sent and received to and from the operational panel 12 is never leaked out. The communication mode determining unit 21 determines the communication made by the communication controller 20 with the operational panel 12 is in the first communication mode.

The communication controller 20 makes either the wired or the wireless communication with the operation terminal device 5. A variety of protocols are used for the communication between the communication controller 20 and the operation terminal device 5. The communication modes in which the communication controller 20 makes communication with the operation terminal device 5 includes the first communication mode with high security and the second communication mode with low security. The communication controller 20 may make communication with the operation terminal device 5 via the wireless communication interface 13 or the network interface 14. In such a case, the communication mode determining unit 21 determines if the communication is made in either the first or the second communication mode. The communication mode determining unit 21 outputs a result of the determination to the screen provider 22.

The screen provider 22 provides the operational panel 12 and/or the operation terminal device 5 via the communication controller 20 with screen data. The screen provider 22 reads the operation screen information 9 in the storage 11 to create the screen to provide to the operational panel 12 and/or the operation terminal device 5. The screen provider 22 then outputs the created screen to the communication controller 20. Based on the result of the determination carried out by the communication mode determining unit 21, the screen provider 22 creates the screen to provide to the operational panel 12 or the operation terminal device 5.

As described above, the communication mode determining unit 21 may determine the communication is made in the first communication mode. In this case, the screen provider 22 creates a first screen, which is the operation screen imposed with no limit, based on the operation screen information 9 and outputs the first screen to the communication controller 20. When the communication mode determining unit 21 determines that the communication is made in the second communication mode, the screen provider 22 creates a second screen, which is the operation screen imposed with a limit, and outputs the second screen to the communication controller 20. The limit is imposed to the second screen to prevent leakage of the confidential information. If the operation terminal device 5 makes communication with the image processing device 2 in the second communication mode which has low security, the operation screen for remotely operating the image processing device 2 is limited.

When the image processing device 2 is making communication with the operation terminal device 5 in the second communication mode, the confidential information may be leaked due to communication interception. The confidential information may be contained in the contents in the operation screen or the confidential information may be transmitted and/or received in response to the user input to the contents (for example, operation key) on the operation screen. In such a case, the confidential information may be leaked. The screen provider 22 then disables the contents on the operation screen, and creates the second screen imposed with the limit not to transmit and/or receive the confidential information.

The operation screen provided by the image processing device 2 to the operation terminal device 5 may not include any content containing the confidential information or any content that may cause transmission and/or receipt of the confidential information in response to the user input. In such a case, no limit is necessary to be imposed to the operation screen. The operation screen provided to the operation terminal device 5 may not cause transmission and/or receipt of the confidential information even when the image processing device 2 makes communication with the operation terminal device 5 in the second communication mode. The screen provider 22 then may create the first screen imposed with no limit.

The input receiver 23 is brought into operation when the operation information is received from the operation terminal device 5 or the operational panel 12 via the communication controller 20. The input receiver 23 outputs the received operation information to the screen provider 22. Once obtaining the operation information from the input receiver 23, the screen provider 22 performs a process based on the operation information. It is assumed, for example, the operation information shows the detail of job setting configured by the user. In this case, the screen provider 22 creates the screen to which the setting is applied (the first screen or the second screen), and outputs the created screen to the communication controller 20. As a result, the operation screen displayed on the operational panel 12 and/or the operation terminal device 5 may be updated based on the user input. If the operation screen displayed on the operation terminal device 5 is the second screen, the input receiver 23 does not have to receive the user input.

As described above, for providing the operation screen to the operational panel 12 over the internal network, the image processing device 2 provides the first screen imposed with no limit and enables the operational panel 12 to display the first screen. When starting the communication with the operation terminal device 5 and providing the operation terminal device 5 with the operation screen for remotely operating the image processing device 2, the image processing device 2 determines if the communication with the operation terminal device 5 is made in the first communication mode or the second communication mode. The image processing device 2 then provides the operation terminal device 5 with the first screen imposed with no limit or the second screen imposed with the limit.

Figure 4:
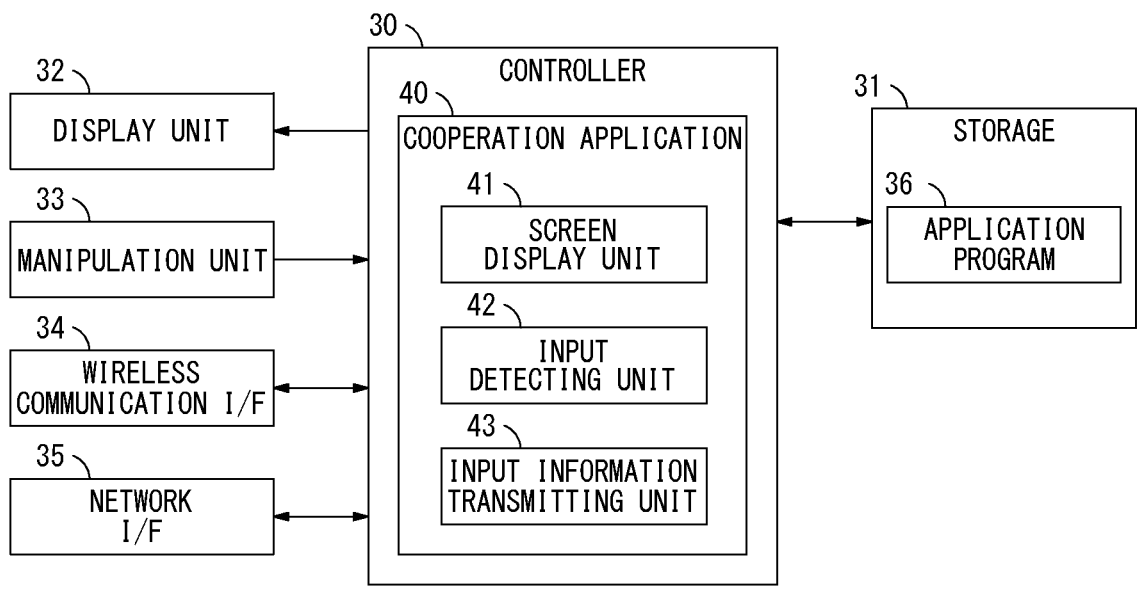
FIG. 4 illustrates a block diagram showing an example of a hardware structure and a functional structure of an operation terminal device.

FIG. 4 illustrates a block diagram showing an example of a hardware structure and a functional structure of the operation terminal device 5. As illustrated in FIG. 4, the operation terminal device 5 includes a controller 30, a storage 31, a display unit 32, a manipulation unit 33, a wireless communication interface 34 and a network interface 35. The controller 30 may include a CPU and a memory, which are not shown in FIG. 4. The storage 31 is formed from a hard disk drive (HDD) or a solid state drive (SSD), for example. The display unit 32 is constructed by a device such as a color liquid crystal display, for instance. The manipulation unit 33 is constructed by parts such as touch panel keys arranged on the display area of the display unit 32. The wireless communication interface 34 makes wireless communication with the image processing device 2. The network interface 35 is an interface that enables the communication with the image processing device 2 over the network 6.

The CPU reads and executes an application program which is installed in advance in the storage 31 so that the controller 30 serves as a cooperation application 40. The cooperation application 40 includes a screen display unit 41, an input detecting unit 42 and an input information transmitting unit 43.

The screen display unit 41 displays the operation screen for remotely operating the image processing device 2 on the display unit 32. In response to receiving screen data of the first screen or the second screen from the image processing device 2 via the wireless communication interface 34 or the network interface 35, the screen display unit 41 displays the operation screen based on the screen data on the display unit 32.

The input detecting unit 42 detects the input made by the user to the manipulation unit 33. It is assumed, for example, the user touches the operation screen displayed on the display unit 32. In such a case, the input detecting unit 42 detects the touching position, and outputs the touching position where the manipulation unit 33 is touched by the user to the input information transmitting unit 43.

The input information transmitting unit 43 constructs input information based on the user input detected by the input detecting unit 42. The input information transmitting unit 43 sends the constructed input information to the image processing device 2 via the wireless communication interface 34 or the network interface 35. While the first screen imposed with no limit is displayed on the display unit 32, for instance, the input information transmitting unit 43 constructs the input information corresponding to the single input and send the constructed input information to the image processing device 2 every time the single input is detected by the input detecting unit 42.

On the other hand, while the second screen imposed with the limit is displayed on the display unit 32 by the image processing device 2, the input information transmitting unit 43 stores each input every time the single input is detected by the input detecting unit 42. The communication between the image processing device 2 and the operation terminal device 5 made in the second communication mode may be changed to the first communication mode. Together with that, the screen displayed on the display unit 32 may be switched from the second screen to the first screen. The input information transmitting unit 43 then constructs the input information based on every user input stored until then, and sends the input information to the image processing device 2 in the first communication mode. While the communication between the image processing device 2 and the operation terminal device 5 is made in the second communication mode which has low security, the transmission and/or receipt of the confidential information between the image processing device 2 and the operation terminal device 5 may be prevented.

Figure 5:
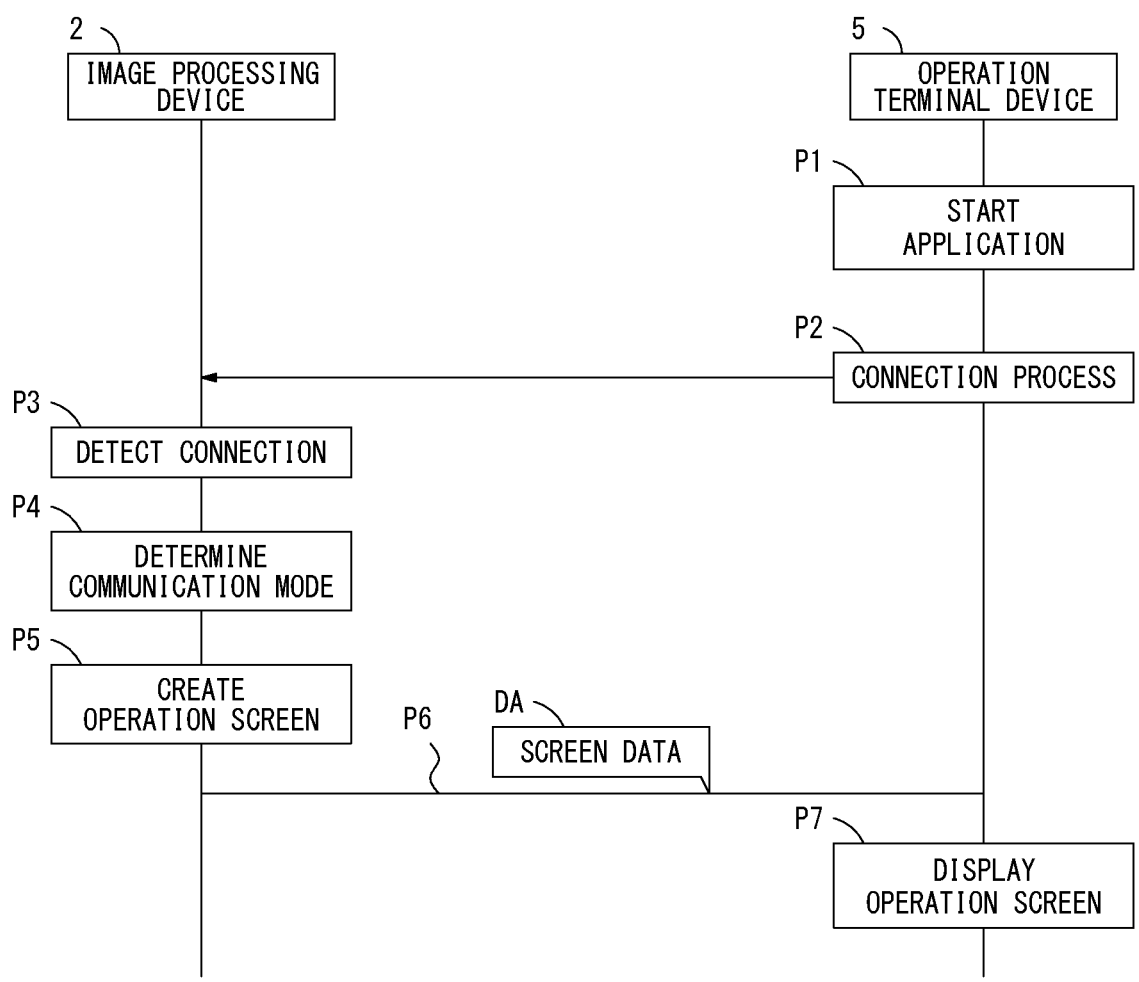
FIG. 5 is a flow diagram showing an exemplary basic process sequence when the image processing device and the operation terminal device operate in cooperation.

FIG. 5 is a flow diagram showing an exemplary basic process sequence when the image processing device 2 and the operation terminal device 5 operate in cooperation. Once the cooperation application 40 is started in the operation terminal device 5 (process P1), the cooperation application 40 processes the connection process to connect with the image processing device 2 (process P2). By processing this connection process, the connection that enables the communication between the image processing device 2 and the operation terminal device 5 is established. The operation terminal device 5 may establish the connection with the image processing device 2 by either wired communication or wireless communication.

The connection with the operation terminal device 5 may be established in response to the start of the cooperation application 40 in the operation terminal device 5. When the image processing device 2 detects the connection with the operation terminal device 5 (process P3), the image processing device 2 determines if the communication with the operation terminal device 5 is either in the first communication mode or in the second communication mode (process P4). The image processing device 2 creates the operation screen (the first screen or the second screen) to display on the operation terminal device 5 based on the result of the determination (process P5). The image processing device 2 sends screen data DA relating to the operation screen to the operation terminal device 5 using the communication mode established with the operation terminal device 5 (process P6).

In response to receiving the screen data DA from the image processing device 2, the operation terminal device 5 displays the operation screen based on the screen data DA on the display unit 32 (process P7). The first screen imposed with no limit or the second screen with limited transmission and/or receipt of the confidential information is displayed on the display unit 32. To be more specific, the communication between the image processing device 2 and the operation terminal device 5 may be made in the first communication mode which has high security. In such a case, the first screen imposed with no limit is displayed on the display unit 32 of the operation terminal device 5. If the communication between the image processing device 2 and the operation terminal device 5 is made in the second communication mode which has low security, the second screen with limited transmission and/or receipt of the confidential information is displayed on the display unit 32 of the operation terminal device 5. The screen data DA sent from the image processing device 2 to the operation terminal device 5 may not contain the contents that cause the transmission and/or receipt of the confidential information. In such a case, even when the communication between the image processing device 2 and the operation terminal device 5 is made in the second communication mode which has low security, the first screen imposed with no limit may be provided to the operation terminal device 5.

Figure 6:
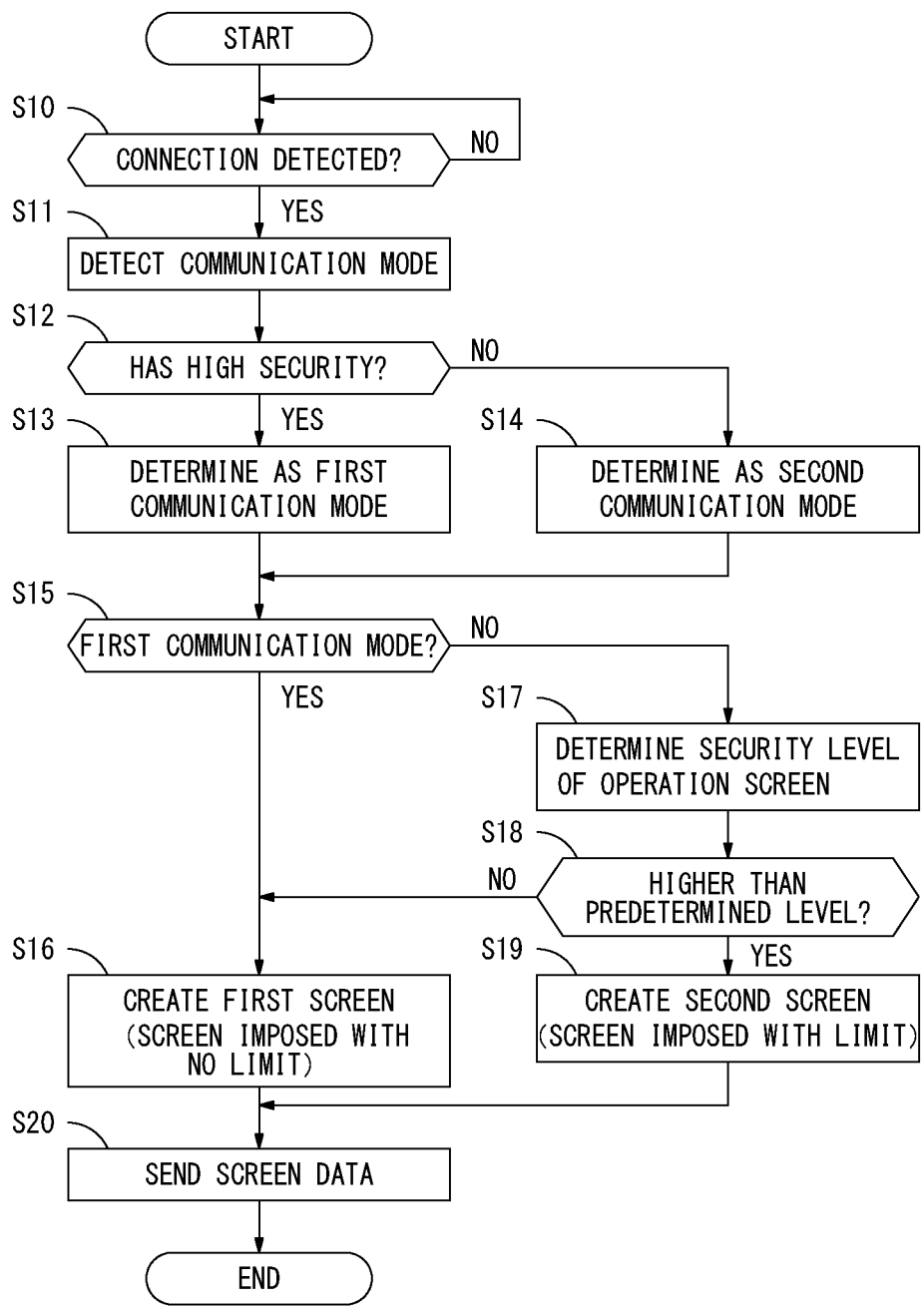
FIG. 6 illustrates a flow diagram explaining an exemplary procedure of a process performed by the image processing device.

FIG. 6 illustrates a flow diagram explaining an exemplary procedure of a process performed by the image processing device 2 to perform the above-described process sequence. This process is performed when the CPU 10a of the controller 10 of the image processing device 2 executes the program 8. Upon the start of the process, the image processing device 2 determines if the connection with the operation terminal device 5 is detected (step S10). The connection with the operation terminal device 5 may be detected (when a result of step S10 is YES). The image processing device 2 brings the communication mode determining unit 21 into operation to detect the communication mode with the operation terminal device 5 (step S11). The communication mode determining unit 21, for example, determines the protocol used by the communication controller 20 for the communication with the operation terminal device 5, thereby detecting the communication mode with the operation terminal device 5. Thus, it may detect whether the communication mode between the image processing device 2 and the operation terminal device 5 is by wireless communication or wired communication.

The communication mode may be wireless communication. In such a case, the communication radio wave may be propagated to outside of the office, resulting in low security. If the communication mode is wired communication, the information transmitted and/or received to and/or from the operation terminal device 5 is not leaked to outside of the office, resulting in high security.

The communication mode determining unit 21 determines the communication mode detected in step S11 has high security (step S12). When the communication mode has high security (when a result of step S12 is YES), the communication mode determining unit 21 determines the communication with the operation terminal device 5 is made in the first communication mode (step S13). If the communication mode determining unit 21 determines the communication mode detected in step S11 has low security (when a result of step S12 is NO), it determines the communication with the operation terminal device 5 is made in the second communication mode (step S14).

The screen provider 22 is brought into operation in the image processing device 2 next. The screen provider 22 determines if the communication mode determined by the communication mode determining unit 21 is the first communication mode (step S15). The communication mode may be the first communication mode (when a result of step S15 is YES). The screen provider 22 then creates the first screen imposed with no limit based on the operation screen information 9 read from the storage 11 (step S16).

The communication mode with the operation terminal device 5 may be the second communication mode (when a result of step S15 is NO). The screen provider 22 then determines the security level of the operation screen information 9 read from the storage 11 as the operation screen to be displayed on the operation terminal device 5 (step S17). The security level is determined based on a criteria whether or not each content contained in the operation screen information 9 causes the transmission and/or the receipt of the confidential information between the image processing device 2 and the operation terminal device 5. When the content that causes the transmission and/or the receipt of the confidential information between the image processing device 2 and the operation terminal device 5 is contained, the security level of the operation screen information 9 is determined to be higher than a predetermined level. The screen provider 22 determines if the security level of the operation screen information 9 is higher than the predetermined level (step S18). The security level of the operation screen information 9 may be higher than the predetermined level (when a result of step S18 is YES). In such a case, the screen provider 22 disables the content that causes the transmission and/or the receipt of the confidential information of the contents contained in the operation screen information 9 read from the storage 11, and creates the second screen with limited transmission and/or receipt of the confidential information (step S19). If the security level of the operation screen information 9 is lower than the predetermined level (when a result of step S18 is NO), the process is proceeded to step S16. The screen provider 22 creates the first screen imposed with no limit based on the operation screen information 9 read from the storage 11.

The screen provider 22 constructs the screen data based on the first screen created in step S16 or the second screen created in step S17, and outputs the screen data to the communication controller 20. The communication controller 20 sends the screen data to the operation terminal device 5 via the wireless communication interface 13 or the network interface 14 (step S20).

Figure 7:
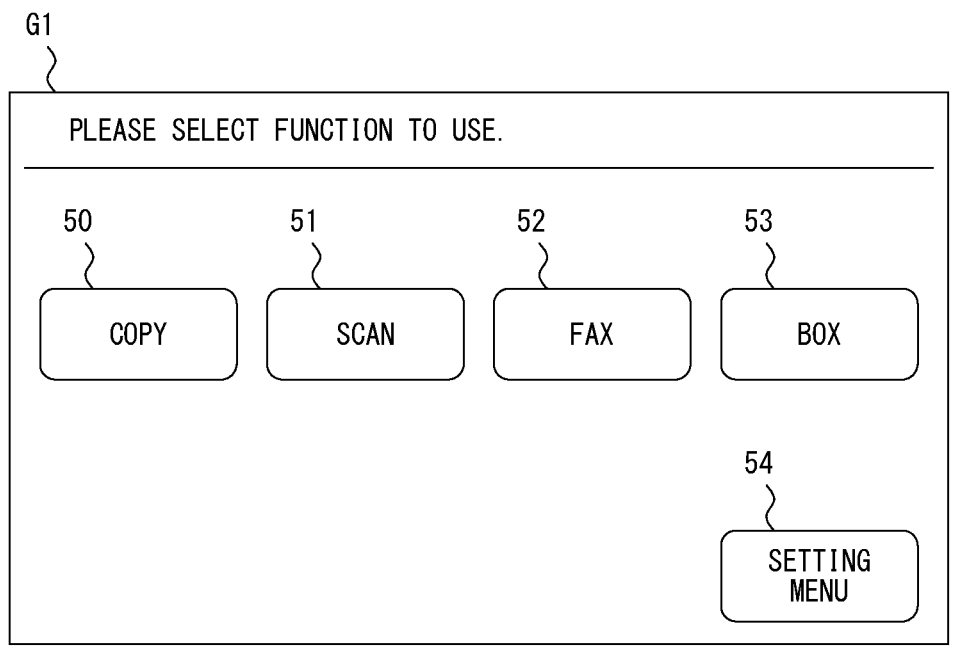
FIG. 7 illustrates a top screen displayed when the operation terminal device connects to the image processing device.

Exemplary operation screens displayed on the operation terminal device 5 are explained next. FIG. 7 illustrates an example of a top screen G1 displayed at the first when the operation terminal device 5 connects to the image processing device 2. The top screen G1 requests the user for selecting a function to use. A copy key 50, a scan key 51, a fax key 52 and a box key 53 corresponding to the respective copy function, scan function, fax function and box function are displayed in the center of the screen. A setting menu key 54 which is operated when the user would like to configure a variety of settings related to the image processing device 2 is displayed in a corner of the screen. The top screen G1 does not include any key that causes transmission and/or receipt of the confidential information between the image processing device 2 and the operation terminal device 5. When the top screen G1 is displayed on the display unit 32 of the operation terminal device 5, the same top screen G1 as illustrated in FIG. 7 is displayed in either of both cases where the communication between the image processing device 2 and the operation terminal device 5 is made in the first communication mode and in the second communication mode.

When the user who operates the operation terminal device 5 operates the setting menu key 54 on the top screen G1, the operation screen displayed on the display unit 32 is switched to a setting menu screen from the top screen G1. FIGS. 8A and 8B illustrate an example of the setting menu screen. FIG. 8A illustrates a first screen G2 imposed with no limit. FIG. 8B illustrates a second screen G3 imposed with the limit. More specifically, while the operation terminal device 5 communicates with the image processing device 2 in the first communication mode, the first screen G2 of FIG. 8A is displayed on the display unit 32 of the operation terminal device 5. While the operation terminal device 5 communicates with the image processing device 2 in the second communication mode, the second screen G3 of FIG. 8B is displayed on the display unit 32 of the operation terminal device 5.

On the first screen G2 of FIG. 8A, operation keys 55 to 58 are displayed. The operation key 55 is for registering an address and/or a box with the image processing device 2. The operation key 56 is for configuring the settings relating to the user. The operation key 57 is for configuring the settings relating to the image processing device 2 with an administrator authority. The operation key 58 is for closing the setting menu screen. When the user operates the operation key 57 to configure the settings with the administrator authority from among the operation keys 55, 56, 57 and 58, an administrator setting screen for configuring the settings with the administrator authority is then sent to the operation terminal device 5 from the image processing device 2. The administrator setting screen contains the confidential information such as network setting of the image processing device 2. If the operation key 57 is operated, the confidential information is sent to the operation terminal device 5 from the image processing device 2. As illustrated in FIG. 8A, this operation key 57 is also displayed normally on the first screen G2, and the user may operate the key.

On the other hand, the operation key 57 for configuring the settings with the administrator authority is disabled and is not displayed on the second screen G3 as illustrated in FIG. 8B. More specifically, the display and the operation of the operation key 57 is limited by the second screen G3. Only the operation key 55 for registering the address and/or the box with the image processing device 2, the operation key 56 for configuring the settings relating to the user and the operation key 58 for closing the setting menu screen are displayed on the second screen G3. Thus, the user is not allowed to operate the operation key 57 for configuring the settings with the administrator authority. The confidential information cannot be sent to the operation terminal device 5 from the image processing device 2. This may prevent the leak of the confidential information such as the network settings of the image processing device 2 to the outside due to the second communication mode with the low security.

Figure 9A:
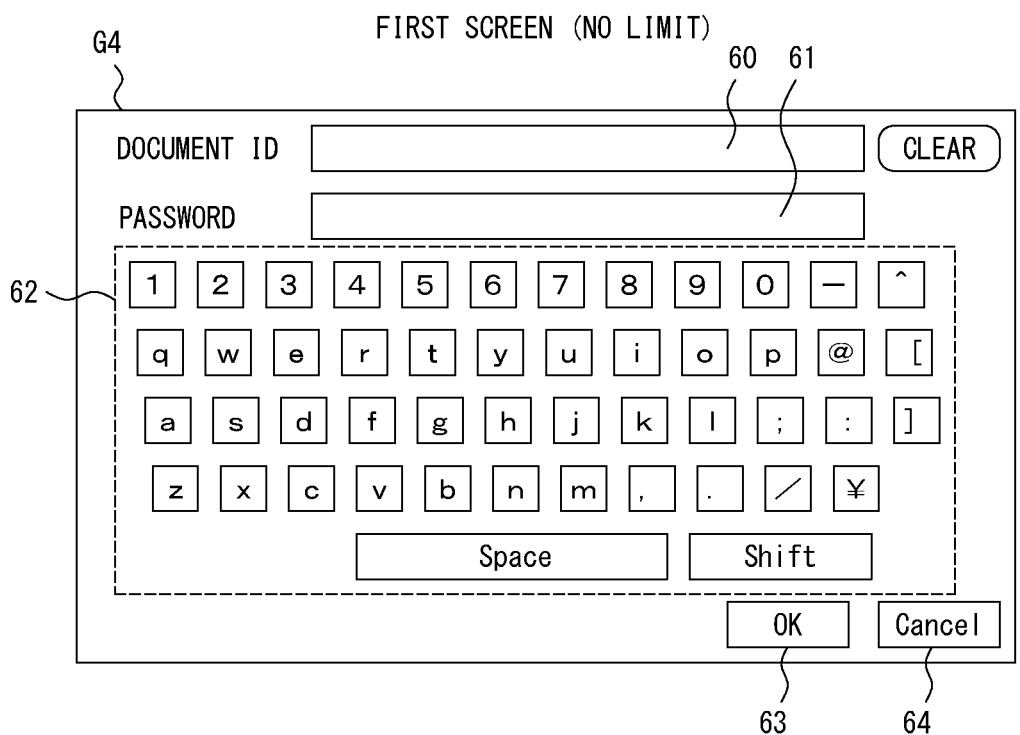
FIGS. 9A and 9B illustrate an example of a password input screen.
Figure 9B:
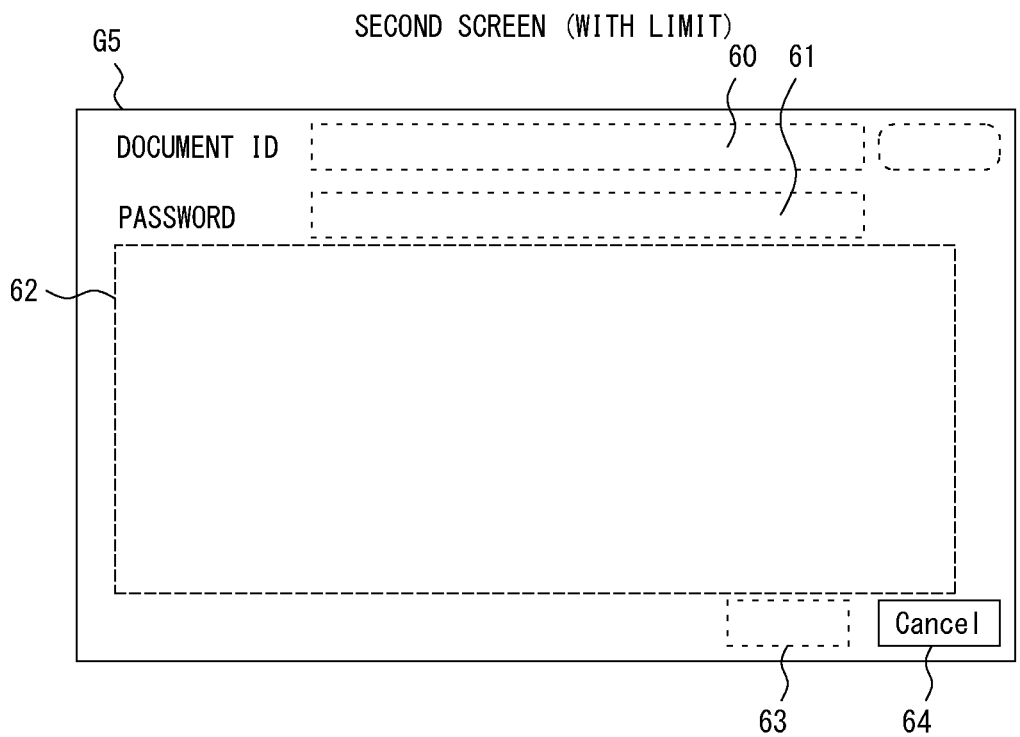

It is assumed, for example, the user selects document data with the password stored in the box as the data subjected to the print job. In such a case, the operation screen displayed on the display unit 32 is switched to a password input screen from the top screen G1. FIG. 9A illustrates a first screen G4 imposed with no limit. FIG. 9B illustrates a second screen G5 imposed with the limit. More specifically, while the operation terminal device 5 communicates with the image processing device 2 in the first communication mode, the first screen G4 of FIG. 9A is displayed on the display unit 32 of the operation terminal device 5. While the operation terminal device 5 communicates with the image processing device 2 in the second communication mode, the second screen G5 of FIG. 9B is displayed on the display unit 32 of the operation terminal device 5.

On the first screen G4 of FIG. 9A, a document ID field 60 for inputting a document ID, a password field 61 for inputting a password, a keyboard area 62 in which a software keyboard is displayed, an OK key 63 for fixing the document ID and the password input by the user and a cancel key 64 for cancelling the input such as the password are displayed. While the first screen G4 is displayed on the display unit 32 of the operation terminal device 5, the user operates the software keyboard which is displayed in the keyboard area 62 so that he or she may input a character string in the document ID field 60 and/or the password field 61. Every time the single character is input in the document ID field 60 or the password field 61, the input information transmitting unit 43 constructs the operation information for the single character and sends the operation information to the image processing device 2 in the first communication mode. If the character string consists of 8 characters is input in the document ID field 60 or the password field 61 with a series of the operation, the input information transmitting unit 43 sends the operation information to the image processing device 2 for 8 times.

On the other hand, the document ID field 60, the password field 61, the keyboard area 62 and the OK key 63 are disabled and not displayed on the second screen G5 as illustrated in FIG. 9B. Thus, the user is not allowed to input the document ID or the password. The cancel key 64 is effective and displayed. The user can only operate the cancel key. Once the user operates the cancel key 64, the operation screen displayed on the display unit 32 returns to the previously displayed screen. The confidential information such as the document ID and/or the password is not sent to the image processing device 2 while the second screen G5 is displayed. This may prevent the leak of the confidential information.

Figure 10A:
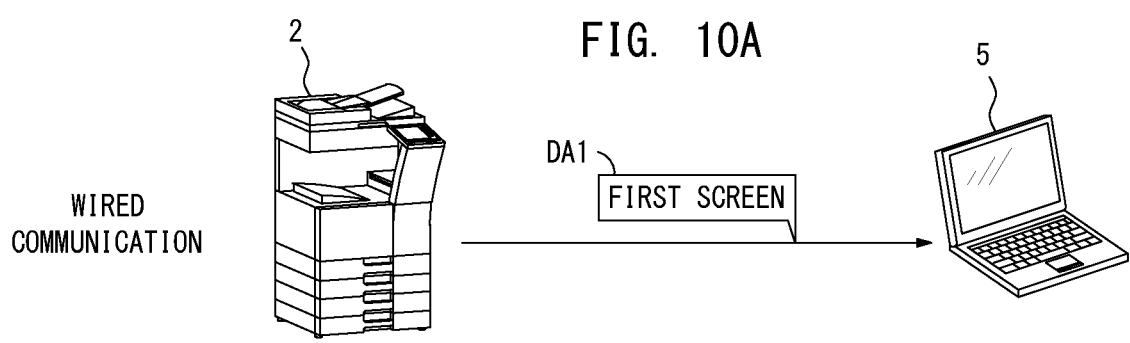
FIGS. 10A and 10B illustrate an example of a screen sent from the image processing device to the operation terminal device according to whether the communication is wired communication or wireless communication.
Figure 10B:
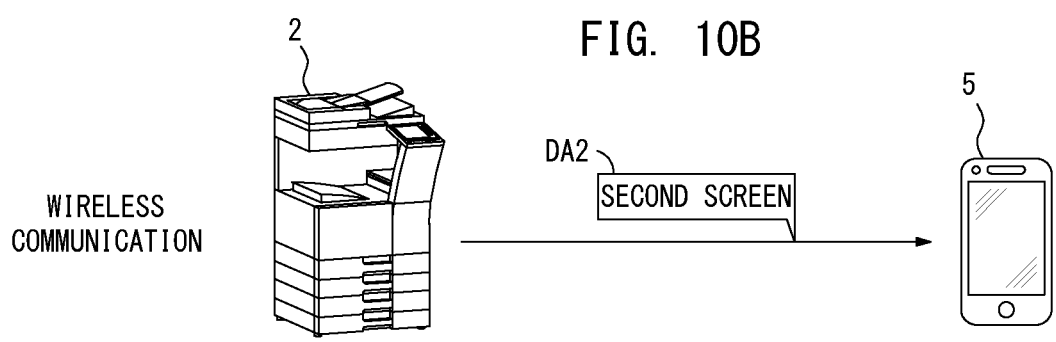

Some ways to determine the communication mode between the image processing device 2 and the operation terminal device 5 are explained next. As described above, when wired communication is made, the communication mode determining unit 21 determines the communication is made in the first communication mode. On the other hand, if wireless communication is made, the communication mode determining unit 21 determines the communication is made in the second communication mode. FIGS. 10A and 10B illustrate an example of the screen sent from the image processing device 2 to the operation terminal device 5 when such determination is made. As illustrated in FIG. 10A, wired communication may be made between the image processing device 2 and the operation terminal device 5. The communication mode determining unit 21 then determines the communication is made in the first communication mode. As a result, a first screen DA1 imposed with no limit is sent from the image processing device 2 to the operation terminal device 5. As illustrated in FIG. 10B, wireless communication may be made between the image processing device 2 and the operation terminal device 5. The communication mode determining unit 21 then determines the communication is made in the second communication mode. As a result, a second screen DA2 with limited transmission and/or receipt of the confidential information is sent from the image processing device 2 to the operation terminal device 5.

Figure 11A:
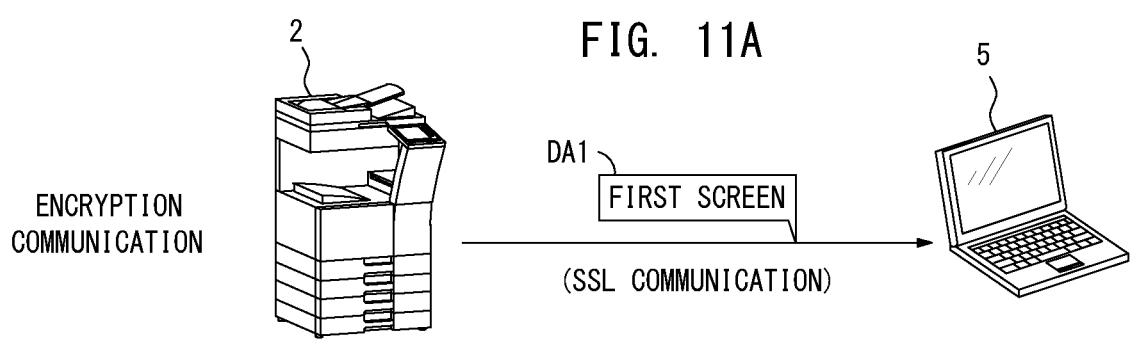
FIGS. 11A and 11B illustrate an example of a screen sent from the image processing device to the operation terminal device according to whether the communication is encryption communication or non-encryption communication.
Figure 11B:
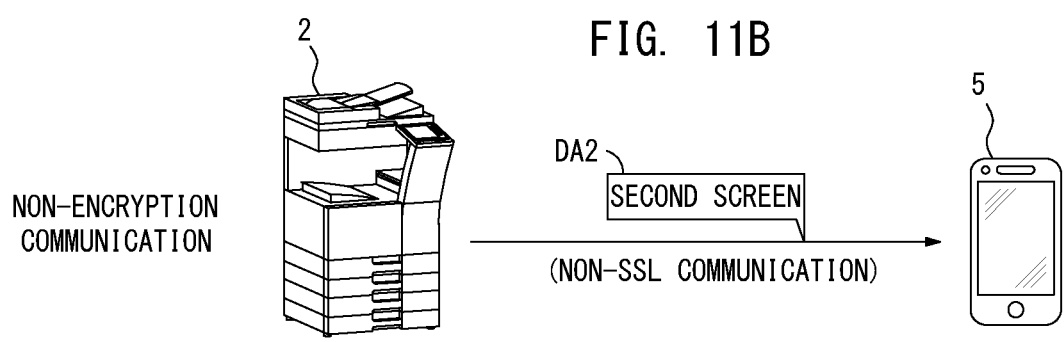

FIGS. 11A and 11B illustrate an example where the communication mode determining unit 21 determines whether an encryption communication or a non-encryption communication is made. As illustrated in FIG. 11A, the encryption communication such as SSL (Secure Socket Layer) communication, for instance, is made between the image processing device 2 and the operation terminal device 5. The communication mode has high security. The communication mode determining unit 21 then determines the communication is made in the first communication mode. As a result, the first screen DA1 imposed with no limit is sent from the image processing device 2 to the operation terminal device 5. As illustrated in FIG. 11B, the non-encryption communication such as non-SSL communication, for instance, may be made between the image processing device 2 and the operation terminal device 5. This communication mode has low security. The communication mode determining unit 21 then determines the communication is made in the second communication mode. As a result, the second screen DA2 with limited transmission and/or receipt of the confidential information is sent from the image processing device 2 to the operation terminal device 5.

Figure 12A:
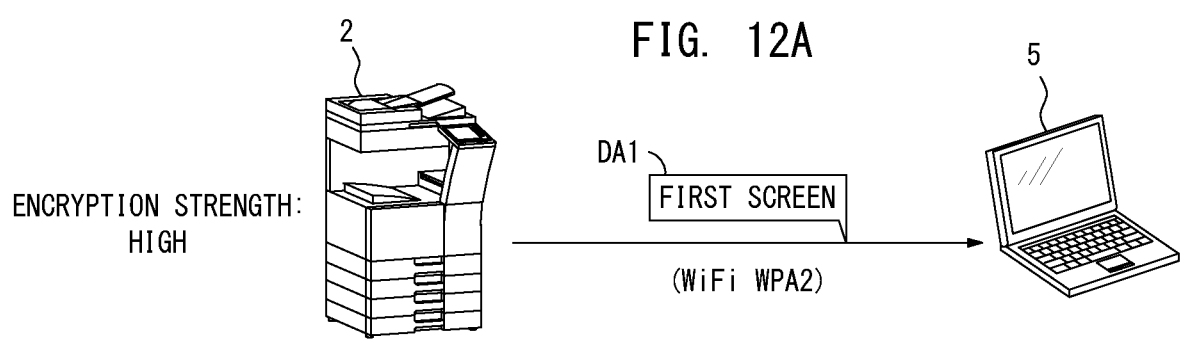
FIGS. 12A and 12B illustrate an example of a screen sent from the image processing device to the operation terminal device according to an encryption strength.
Figure 12B:
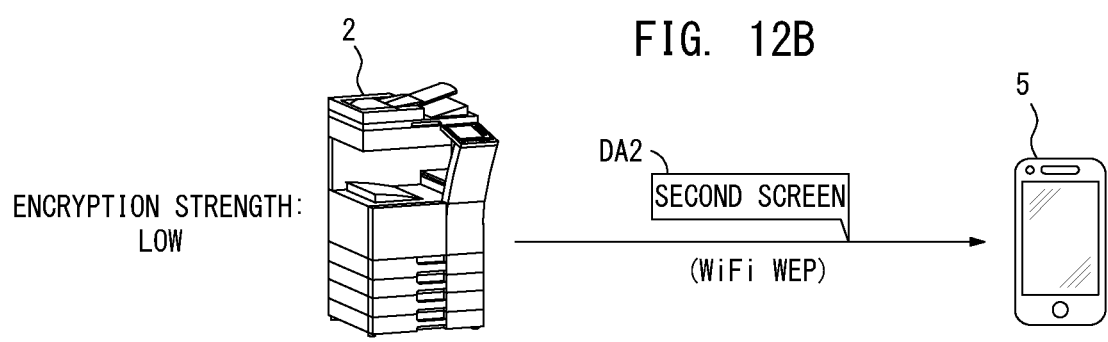

FIGS. 12A and 12B illustrate an example where the communication mode determining unit 21 determines whether the encryption communication has high encryption strength or low encryption strength. As illustrated in FIG. 12A, wireless communication using WiFi is made between the image processing device 2 and the operation terminal device 5, and a WPA2 (Wi-Fi Protected Access 2) may be used as a protocol. In this case, the encryption communication has high encryption strength. The communication mode determining unit 21 determines the communication is made in the first communication mode. As a result, the first screen DA1 imposed with no limit is sent from the image processing device 2 to the operation terminal device 5. As illustrated in FIG. 12B, the wireless communication using WiFi is made between the image processing device 2 and the operation terminal device 5, and a WEP (Wired Equivalent Privacy) may be used as the protocol. The communication has low encryption strength. The communication mode determining unit 21 then determines the communication is made in the second communication mode. As a result, the second screen DA2 with limited transmission and/or receipt of the confidential information is sent from the image processing device 2 to the operation terminal device 5.

Besides the aforementioned examples, when wireless communication is made between the image processing device 2 and the operation terminal device 5, the communication mode determining unit 21 may determine the communication is made in the first communication mode if the wireless communication is Bluetooth communication, and may determine the communication is made in the second communication mode if the wireless communication is WiFi communication. To be more specific, the communications between the image processing device 2 and the operation terminal device 5 may be made in the respective different communication mode. In such a case, the communication mode determining unit 21 may determine the communication is made in the first communication mode if the communication mode has relatively high security, and determine the communication is made in the second communication mode if the communication mode has relatively low security. The communication mode determining unit 21 determines the protocol used for the communication between the image processing device 2 and the operation terminal device 5 so that it may determine if the communication is made in the first communication mode or the second communication mode whatever the aforementioned way it employs.

As described above, the image processing device 2 of the first preferred embodiment provides the operation screen to the operation terminal device 5 and receives the input information from the operation terminal device 5 so that it may accept the remote operation from the operation terminal device 5. The image processing device 2 may make communication with the operation terminal device 5 in either the first communication mode or the second communication mode, which is different from the first communication mode. The image processing device 2 determines if the communication with the operation terminal device 5 is made in either the first communication mode or the second communication mode. When determining the communication is made in the first communication mode, the image processing device 2 creates the first screen imposed with no limit and provides the operation terminal device 5 with the created screen. When determining the communication is made in the second communication mode, the image processing device 2 creates the second screen imposed with the limit and provides the operation terminal device 5 with the created screen. The image processing device 2 with the above-described structure provides the operation terminal device 5 with the second screen imposed with the limit when the communication is made in the second communication mode. This may prevent serious information leakage from the information transmitted and received between the image processing device 2 and the operation terminal device 5.

As described above, the leakage of the confidential information when the communication is made between the image processing device and the operation terminal device may be prevented. The operation terminal device may remotely operate the image processing device with high security.

Second Preferred Embodiment

Figure 13:
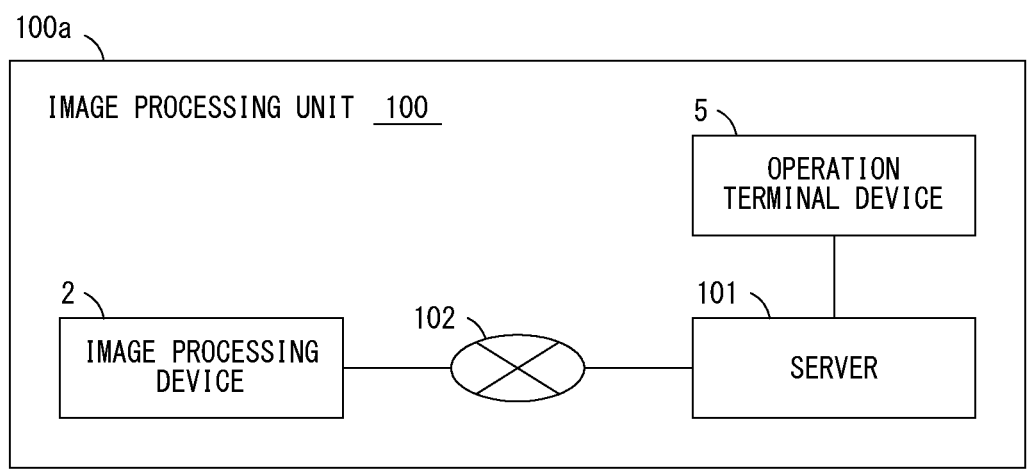
FIG. 13 illustrates an exemplary conceptual configuration of the image processing system in which a second preferred embodiment may be practiced.

The second preferred embodiment of the present invention is explained next. FIG. 13 illustrates an exemplary conceptual configuration of an image processing system 1a in which the second preferred embodiment of the present invention may be practiced. The image processing system 1a includes the above-described image processing device 2, a server 101 and the above-described operation terminal device 5. Those image processing device 2, the server 101 and the above-described operation terminal device 5 installed in a single housing 100a are consisted as an image processing unit 100. An internal network 102 is installed inside the image processing unit 100. The image processing device 2 and the server 101 may make communication with each other over the internal network 102. The operation terminal device 5 is detachable for the server 101. When the operation terminal device 5 is connected to the server 101, the operation terminal device 5 may make wired communication with the image processing device 2 via the server 101. The operation terminal device 5 includes the wireless communication function as the same as in the first preferred embodiment. When the operation terminal device 5 is detached from the server 101, the operation terminal device 5 may make wireless communication with the image processing device 2. More specifically, the operation terminal device 5 may make wireless communication with the image processing device 2 in a communication mode based on a protocol such as near distance radio communication, Bluetooth (registered trademark) or WiFi, which is the same as a tablet terminal, when it is detached from the server 101.

When providing the operation terminal device 5 with the operation screen, the image processing device 2 of the second preferred embodiment switches the first screen DA1 and the second screen DA2 depending on whether or not wired communication can be made with the operation terminal device 5, and provides the operation terminal device 5 with the screen.

Figure 14A:
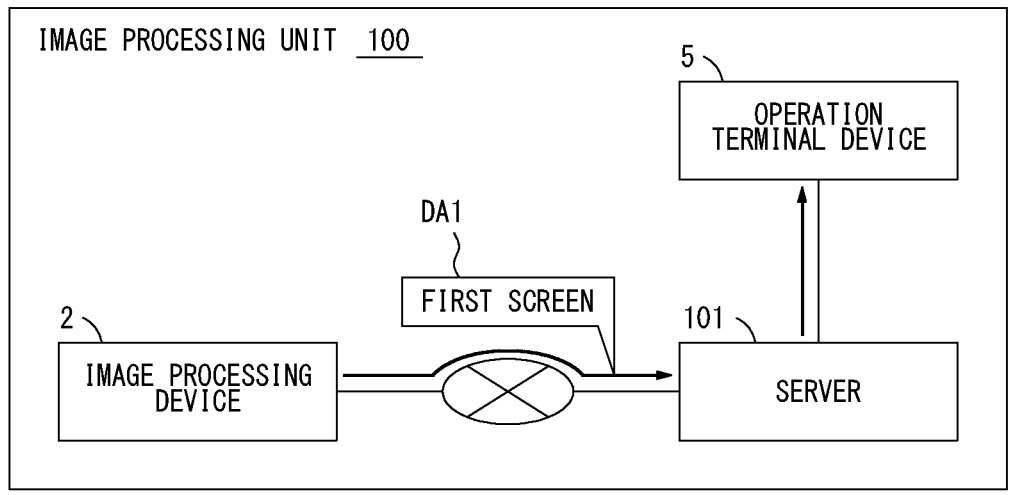
FIGS. 14A and 14B illustrate an example of the screen to be provided to the operation terminal device from the image processing device.
Figure 14B:
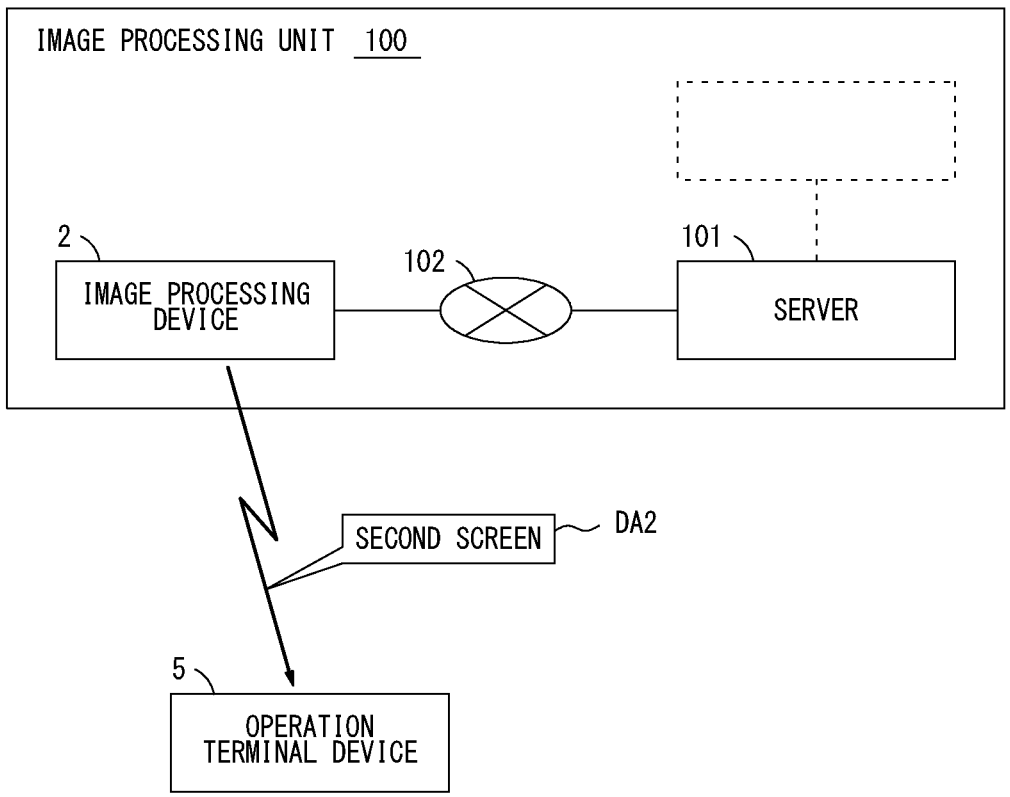

FIGS. 14A and 14B illustrate an example of the screen to be provided to the operation terminal device 5 from the image processing device 2. FIG. 14A illustrates an example where the operation terminal device 5 is connected to the server 101. When the operation terminal device 5 is connected to the server 101, the image processing device 2 may make wired communication with the operation terminal device 5 over the internal network 102 or via the server 101. The image processing device 2 then determines communication with the operation terminal device 5 is made in the first communication mode which has high security, and creates the first screen DA1 imposed with no limit. The image processing device 2 provides the operation terminal device 5 with the first screen DA1 over the internal network 102 or via the server 101. As described above, when the operation terminal device 5 is installed in the image processing unit 100 and connected to the server 101, which enables wired communication therebetween, the user is allowed to operate on the first screen DA1. Thus, the user is allowed to configure settings related to the image processing device 2 and/or to input information such as a document ID and/or a password for browsing document data for which the password is set with an administrator authority.

FIG. 14B illustrates an example where the operation terminal device 5 is detached from the server 101. When the operation terminal device 5 is detached from the server 101, the image processing device 2 cannot make wired communication with the operation terminal device 5 over the internal network 102 or via the server 101. In this case, the image processing device 2 makes wireless communication with the operation terminal device 5. The image processing device 2 then determines communication with the operation terminal device 5 is made in the second communication mode, which has low security, and creates the second screen DA2 imposed with a limit. The image processing device 2 provides the operation terminal device 5 with the second screen DA2 by wireless communication. As described above, when the operation terminal device 5 is removed from the image processing unit 100 and detached from the server 101, the user needs to operate on the second screen DA2. Thus, the user is not allowed to configure settings related to the image processing device 2 and/or to input information such as the document ID and/or the password for browsing the document data for which the password is set with the administrator authority. To be more specific, the transmission and/or the receipt of the confidential information between the image processing device 2 and the operation terminal device 5 is limited in the example of FIG. 14B.

As described above, the operation terminal device 5 is detachable for the server 101. The operation terminal device 5 may be detached from the server 101 as it was connected to the server 101 while the image processing device 2 provides the operation terminal device 5 with the operation screen. On the contrary, the operation terminal device 5 may be connected to the server 101 as it was detached from the server 101. If the communication mode between the image processing device 2 and the operation terminal device 5 is switched while the image processing device 2 and the operation terminal device 5 are working together as described above, the image processing device 2 switches the operation screen to provide to the operation terminal device 5 from the first screen DA1 to the second screen DA2 or from the second screen DA2 to the first screen DA1.

Figure 15:
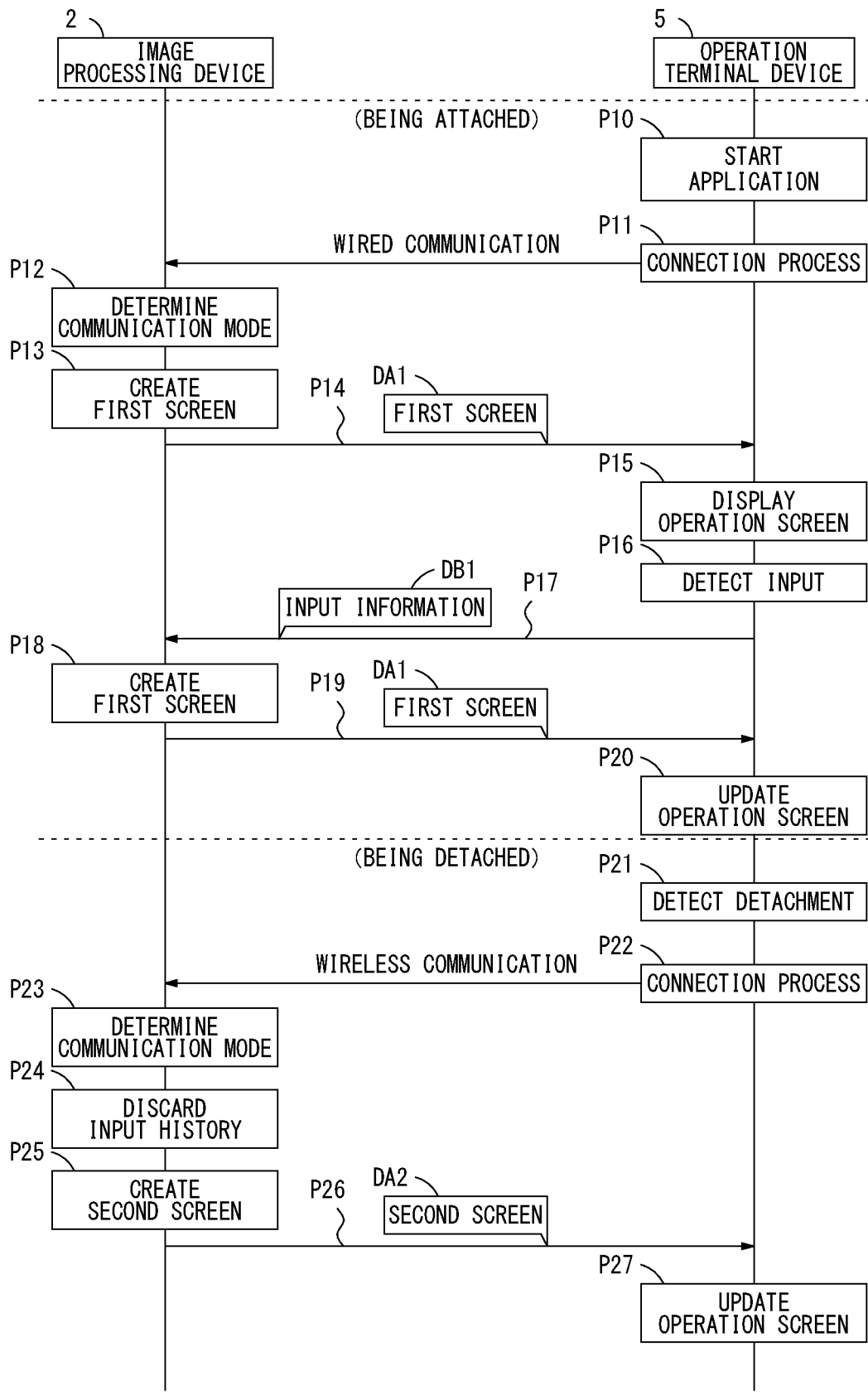
FIG. 15 is a flow diagram showing an exemplary process sequence when the operation terminal device is detached as it was attached.

FIG. 15 is a flow diagram showing an exemplary process sequence when the operation terminal device 5 is detached from the server 101 as it was connected to the server 101. Once the cooperation application 40 is started in the operation terminal device 5 while the operation terminal device 5 is connected to the server 101 (process P10), the cooperation application 40 processes the connection process to connect with the image processing device 2 (process P11). By processing this connection process, the connection that enables wired communication between the image processing device 2 and the operation terminal device 5 is established.

As starting the communication with the operation terminal device 5, the image processing device 2 brings the communication mode determining unit 21 into operation. The communication mode determining unit 21 determines that the communication with the operation terminal device 5 is in the first communication mode which has high security. The image processing device 2 brings the screen provider 22 into operation to create the first screen DA1 imposed with no limit as the operation screen corresponding to the first communication mode (process P13), and send the created first screen DA1 to the operation terminal device 5 (process P14). The first screen DA1 is sent to the operation terminal device 5 over the internal network 102 or via the server 101. Even if the first screen DA1 contains the confidential information, the confidential information never leaked out.

In response to receiving the first screen data DA1 from the image processing device 2, the operation terminal device 5 displays the operation screen, on which the user operates, on the display unit 32 based on the first screen data DA1 (process P15). As the user input to the first screen DA1 is detected by the operation terminal device 5, an input information transmitting unit 43 constructs input information DB1 based on the input (process P16). The input information transmitting unit 43 sends the input information DB1 to the image processing device 2 (process P17). Also in this case, the input information DB1 is sent to the image processing device 2 over the internal network 102 or via the server 101. Even if the input information DB1 contains text information with high security that consists the document ID and/or the password, the text information never leaked out.

In response to receiving the input information DB1 from the operation terminal device 5, the image processing device 2 creates again the first screen data DA1 to which the input information DB1 is applied (process P18), and sends the first screen data DA1 to the operation terminal device 5 (process P19). In response to receiving the first screen data DA1 to which the input information DB1 is applied from the image processing device 2, the operation terminal device 5 updates the operation screen displayed on the display unit 32 based on the first screen data DA1 (process P20). Thus, the user is allowed to check whether his or her input is applied.

Once the operation terminal device 5 is removed from the image processing unit 100, the operation terminal device 5 detects that it has detached from the server 101 (process P21). The operation terminal device 5 finds that it may not make the same wired communication as it has made. The operation terminal device 5 then processes the connection process with the image processing device 2 by wireless communication (process P22). By processing this connection process, the connection that enables wireless communication between the image processing device 2 and the operation terminal device 5 is established.

As restarting the communication with the operation terminal device 5 by wireless communication, the image processing device 2 brings the communication mode determining unit 21 into operation. The communication mode determining unit 21 determines the communication with the operation terminal device 5 is made in what communication mode (process P23). The communication mode determining unit 21 determines the communication with the operation terminal device 5 is in the second communication mode which has low security. The screen provider 22 then deletes entire input information DB1 received from the operation terminal device 5 by wired communication so that input history relating to the user inputs on the first screen DA1 is discarded. The operation screen provided to the operation terminal device 5 from the image processing device 2 is returned to the top screen (initial screen). The screen provider 22 creates the second screen DA2 with limited transmission and/or receipt of the confidential information as the operation screen corresponding to the second communication mode (process P25), and sends the created second screen DA2 to the operation terminal device 5 (process P26). As already discussed earlier, the top screen does not contain the confidential information. The same screen as the first screen DA1 may be sent to the operation terminal device 5. The operation terminal device 5 updates the operation screen displayed on the display unit 32 based on the second screen DA2 received from the image processing device 2 after switching to the second communication mode (process P27).

Once the communication between the image processing device 2 and the operation terminal device 5 made in the first communication mode is switched to the second communication mode, the image processing device 2 switches the operation screen to provide to the operation terminal device 5 to the second screen DA2 from the first screen DA1. As a result, this may satisfactory prevent the transmission and/or the receipt of the confidential information between the image processing device 2 and the operation terminal device 5 after the communication mode is switched to the second communication mode from the first communication mode. Especially, the image processing device 2 discards all of the inputs made by the user on the first screen DA1 at the time when the communication mode is switched to the second communication mode. This may prevent the confidential information such as setting items configured with the administrator authority to be contained in the second screen DA2.

The image processing device 2 does not have to discard all of the user inputs operated on the first screen DA1 at the time when the communication mode is switched to the second communication mode. The image processing device 2 may store the inputs instead of discarding them. In such a case, however, it is preferable not to apply the user input operated on the first screen DA1 to the second screen DA2 when creating the second screen DA2. All of the user inputs operated on the first screen DA1 until then may be stored at the time when the communication mode is switched to the second communication mode. The image processing device 2 then may create the first screen DA1 to which the user inputs operated on the previous first screen DA1 are applied when the communication mode is back to the first communication mode from the second communication mode. The user may not be able to make intended inputs due to the detachment of the operation terminal device 5 from the server 101. The user may continue the input from the previous one by putting back the operation terminal device 5 to connect to the server 101.

Figure 16:
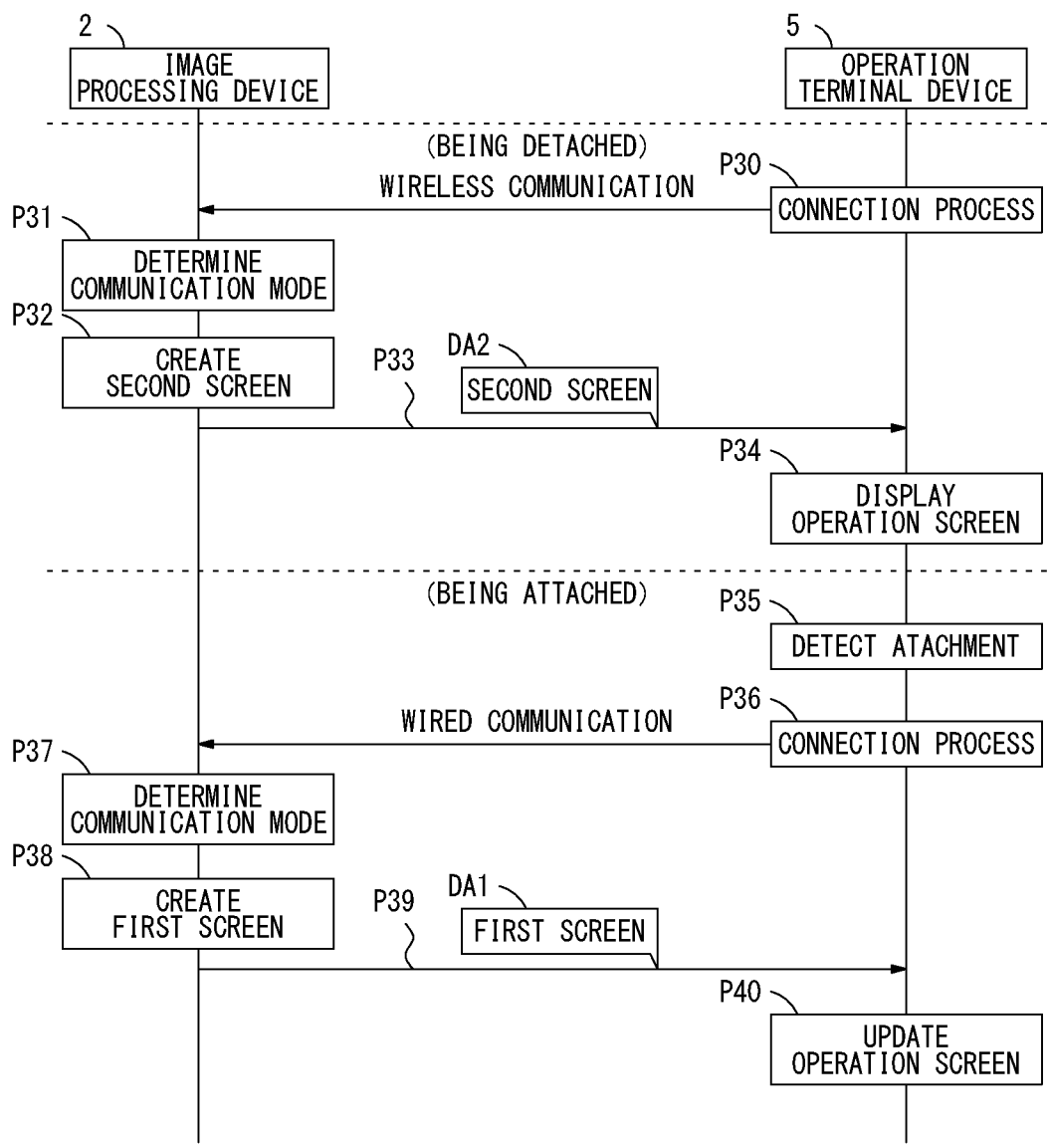
FIG. 16 is a flow diagram showing an exemplary process sequence when the operation terminal device is attached as it was detached.

FIG. 16 is a flow diagram showing an exemplary process sequence when the operation terminal device 5 is connected to the server 101 as it was detached from the server 101. Once the cooperation application 40 is started in the operation terminal device 5 while the operation terminal device 5 is detached from the server 101, the cooperation application 40 processes the connection process to connect with the image processing device 2 (process P30). By processing this connection process, the connection that enables wireless communication between the image processing device 2 and the operation terminal device 5 is established. The image processing device 2 brings the communication mode determining unit 21 into operation to determine the communication with the operation terminal device 5 is in the second communication mode which has low security (process P31). The screen provider 22 creates the second screen DA2 with limited transmission and/or receipt of the confidential information as the operation screen corresponding to the second communication mode (process P32), and sends the created second screen DA2 to the operation terminal device 5

(process P33). The operation terminal device 5 displays the operation screen on the display unit 32 based on the second screen DA2 (process P34).

The operation terminal device 5 then may be attached to the image processing unit 100 after that and connection that enables wired communication between the operation terminal device 5 and the server 101 may be established. The operation terminal device 5 then detects that it has attached to the server 101 (process P35). The operation terminal device 5 finds that it may make wired communication with the image processing device 2. The operation terminal device 5 then processes the connection process to connect with the image processing device 2 by wired communication (process P36). By processing this connection process, the connection that enables wired communication between the image processing device 2 and the operation terminal device 5 is established.

As restarting the communication with the operation terminal device 5 by wired communication, the image processing device 2 brings the communication mode determining unit 21 into operation. The communication mode determining unit 21 determines the communication with the operation terminal device 5 is made in what communication mode. The communication mode determining unit 21 then determines that the communication with the operation terminal device 5 is made in the first communication mode which has high security. The screen provider 22 creates the first screen DA1 with no limited transmission and/or receipt of the confidential information as the operation screen corresponding to the first communication mode (process P38). The screen provider 22 may store all of the user inputs operated on the first screen DA1 which was displayed while the communication was made in the first communication mode prior to process P30. The image processing device 2 then may create the first screen DA1 to which the user inputs operated on the previous first screen DA1 are applied as described above. The screen provider 22 sends the first screen DA1 to the operation terminal device 5. The operation terminal device 5 then updates the operation screen displayed on the display unit 32 based on the first screen DA1 received from the image processing device 2 after switching to the first communication mode (process P40).

Once the communication between the image processing device 2 and the operation terminal device 5 made in the second communication mode is switched to the first communication mode, the image processing device 2 switches the operation screen to provide to the operation terminal device 5 to the first screen DA1 from the second screen DA2. As a result, the transmission and/or the receipt of the confidential information between the image processing device 2 and the operation terminal device 5 may be allowed after the communication mode is switched to the first communication mode from the second communication mode. The user may configure the settings and/or browse the document data for which the password is set with the administrator authority.

Figure 17:
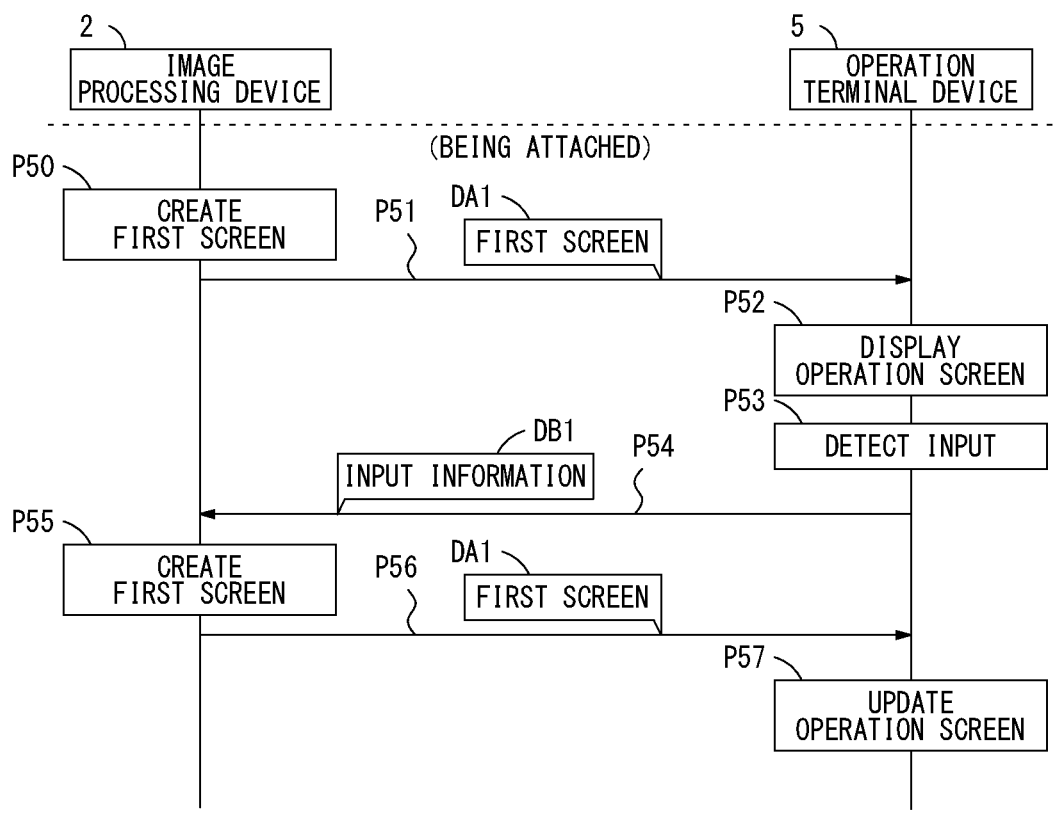
FIG. 17 illustrates an exemplary manner to transmit input information when the operation terminal device is attached to an image processing unit.

The manner of the transmission of the input information DB1 to the operation terminal device 5 is explained next. FIG. 17 illustrates an exemplary manner to transmit the input information DB1 when the operation terminal device 5 is attached to the image processing unit 100. The image processing device 2 creates the first screen DA1 while the communication in the first communication mode is made (process P50), and sends the created first screen DA1 to the operation terminal device 5 (process P51). The first screen DA1 created in process P50 is as illustrated in FIG. 9A, for instance.

The operation terminal device 5 displays the operation screen based on the first screen data DA1 received from the image processing device 2 on the display unit 32 (process P52). As the user input on the first screen DA1 is detected by the operation terminal device 5 (process P53), the operation terminal device 5 constructs the input information DB1 based on the input. The operation terminal device 5 sends the input information DB1 to the image processing device 2 (process P54). If, for example, the user touches a predetermined position on the first screen DA1, the input information DB1 showing the touching position is sent to the image processing device 2.

In response to receiving the input information DB1 from the operation terminal device 5, the image processing device 2 creates the first screen DA1 to which the user input is applied based on the input information DB1 (process P55), and sends the first screen DA1 to the operation terminal device 5 (process P56). In response to receiving the first screen DA1 from the image processing device 2 after sending the input information DB1, the operation terminal device 5 updates the operation screen displayed on the display unit 32 based on the first screen DA1 (process P57).

As described above, every time the user operates on the first screen DA1, the operation terminal device 5 sends the input information DB1 to the image processing device 2. The image processing device 2 sends the first screen data DA1 to which the user input DB1 is applied based on the input information DB1 to the operation terminal device 5. Those operations are repeatedly performed. While the communication in the first communication mode is made between the image processing device 2 and the operation terminal device 5, the first screen DA1 displayed on the operation terminal device 5 is updated to the one to which the input is applied in real time in response to the user input operated on the first screen DA1.

Figure 18:
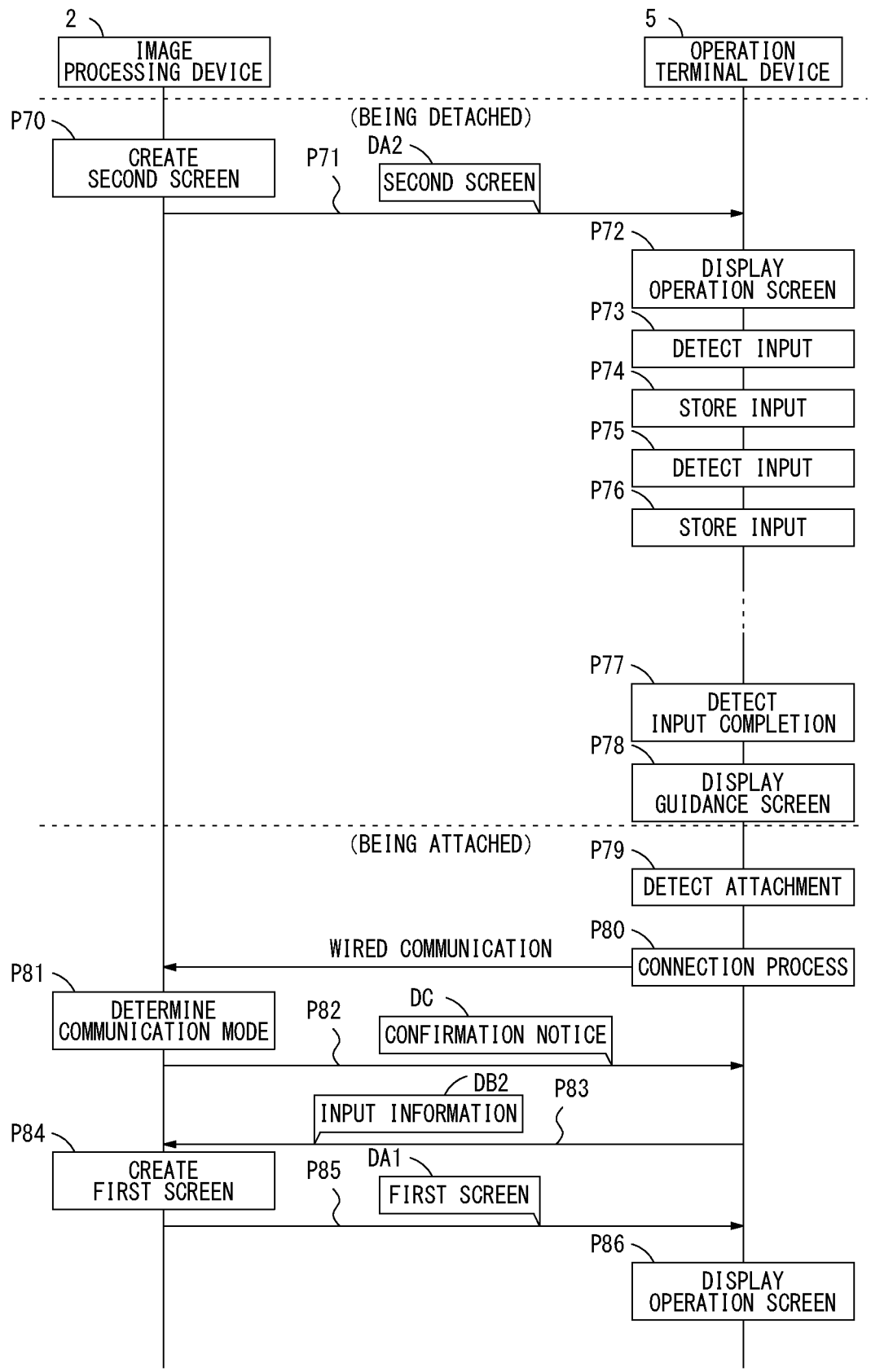
FIG. 18 illustrates an exemplary manner to transmit the input information when the operation terminal device is attached to the image processing unit as it was detached from the image processing unit.

FIG. 18 illustrates an exemplary manner to transmit the input information DB1 when the operation terminal device 5 is attached to the image processing unit 100 as it was removed from the image processing unit 100. The image processing device 2 creates the second screen DA2 while the communication is made in the second communication mode (process P70), and sends the created second screen DA2 to the operation terminal device 5 (process P71). The second screen DA2 created in process P70 is the screen as illustrated in FIG. 9A, for instance, and is the same screen as the one created when the communication is made in the first communication mode. More specifically, the second screen DA2 that enables the input of the character string to the document ID field 60 and/or the password input field 61 is created. The second screen DA2, however, is still the screen with limited transmission and/or receipt of the confidential information.

The operation terminal device 5 displays the operation screen based on the second screen DA2 received from the image processing device 2 on the display unit 32 (process P72). As the user input on the second screen DA2 is detected by the operation terminal device 5 (process P73), the operation terminal device 5 stores the detail of the user input (process P74). As the user inputs the single character in the password field 41, for example, the operation terminal device 5 stores the detail of the input. Even when the user input operated on the second screen DA2 is detected after that (process P75), the operation terminal device 5 stores the detail of the input (process P76). Thereafter, the operation terminal device 5 stores the detail of the user input in the similar manner.

The user may operate the OK key 63, for instance, to instruct the input is complete, the operation terminal device 5 detects that the user input has been completed (process P77). The operation terminal device 5 displays a guidance screen to notify the user that the operation terminal device 5 should be attached to the image processing unit 100 on the display unit 32 (process P78).

Figure 19:
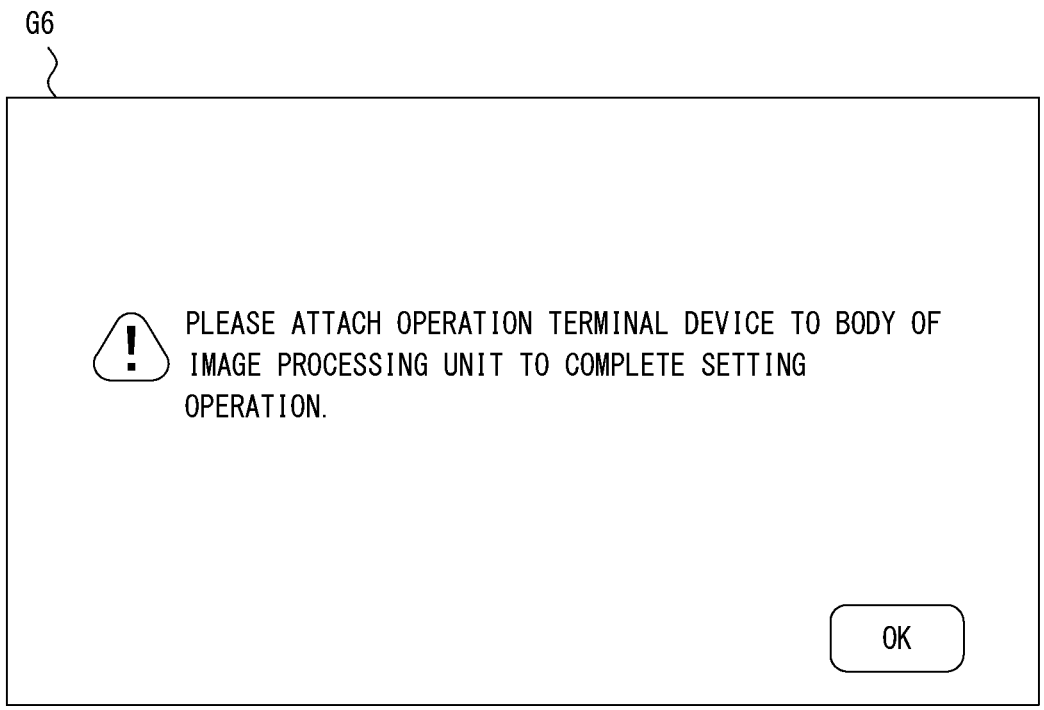
FIG. 19 illustrates an example of a guidance screen displayed on the operation terminal device.

FIG. 19 illustrates an example of a guidance screen G6 displayed on the operation terminal device 5. The guidance screen G6 is created at the operation terminal device 5 and displayed on the display unit 32. A message that requests the user to attach the operation terminal device 5 to the image processing unit 100 is shown on the guidance screen G6 as illustrated in FIG. 19. In order to apply all the inputs the user has made to the image processing device 2 after operating the OK key 63, he or she may find out that the operation terminal device 5 needs to be attached to the image processing unit 100. The user then attaches the operation terminal device 5 to the image processing unit 100.

The operation terminal device 5 may be attached to the image processing unit 100, and the operation terminal device 5 and the server 101 may be connected to each other by which wireless communication is enabled. The operation terminal device 5 then detects that it has been attached to the server 101 (process P79). The operation terminal device 5 processes the connection process to connect with the image processing device 2 by wired communication (process P80). By processing this connection process, the connection that enables wired communication between the image processing device 2 and the operation terminal device 5 is established.

As starting the communication with the operation terminal device 5 by wired communication, the image processing device 2 determines the communication with the operation terminal device 5 is in the first communication mode (process P81). The screen controller 20 sends a confirmation notice DC that shows it has confirmed the first communication mode to the operation terminal device 5 (process P82). In response to receiving the confirmation notice DC, the operation terminal device 5 constructs the input information DB2 based on the detail of the user input stored in processes P74 and P76, and sends the input information DB2 to the image processing device 2 in the first communication mode (wired communication) (process P83). As a result, the input information DB2 based on the series of inputs made by the user is sent to the image processing device 2 from the operation terminal device 5 in the first communication mode which has high security.

In response to receiving the input information DB2 from the operation terminal device 5, the image processing device 2 creates the first screen DA1 to which the input information DB2 is applied, and sends the first screen DA1 to the operation terminal device 5 in the first communication mode (process P85). In response to receiving the first screen DA1 from the image processing device 2, the operation terminal device 5 displays the operation screen based on the first screen DA1 on the display unit 32 (process P86). The user is then allowed to check the operation screen to which the inputs he or she made while the operation terminal device 5 was removed from the image processing unit 100 are applied.

As described above, every time the single operation is detected by the manipulation unit 33 while the first screen DA1 is displayed on the display unit 32, the operation terminal device 5 sends the input information DB1 to the image processing device 2. While the second screen DA2 is displayed on the display unit 32, the input detected by the manipulation unit 33 is stored. When the screen displayed on the display unit 32 is switched to the first screen DA1 from the second screen DA2, the input information DB2 based on the stored input is sent to the image processing device 2. The input information based on the user input is not sent to the image processing device 2 while the second screen DA2 is displayed on the display unit 32 of the operation terminal device 5. At the time when the second screen DA2 is switched to the first screen DA1, the input information DB2 is sent to the image processing device 2 from the operation terminal device 5. When the communication in the second communication mode is switched to the first communication made, the image processing device 2 may provide the operation terminal device 5 with the first screen DA1 to which the user input is applied. Thus, the user is enabled to continue the input made on the second screen DA2.

The structures and operations except for the above-described points in the second preferred embodiment are the same as those in the first preferred embodiment.

(Modifications)

While the preferred embodiments of the present invention have been described above, the present invention is not limited to the preferred embodiments. Various modifications may be applied to the present invention.

In the second preferred embodiment, for example, the example where the operation terminal device 5 is detachable for the server 101 is explained. However, this is given not for limitation. The operation terminal device 5 may be removable for the image processing device 2.

It is assumed that the operational panel 12 is removable for the body of the image processing device 2 of the first preferred embodiment. In such a case, while the operational panel 12 is attached to the body of the image processing device 2, the operational panel 12 and the image processing device 2 may make communication in the first communication mode. When the operational panel 12 is detached from the body of the image processing device 2, the operational panel 12 may make communication in the second communication mode. In this case, the same way may be applied as the second preferred embodiment.

In the above-described present preferred embodiments, each of the first screen and the second screen is created based on the same operation screen information 9 so that screen structures of the first screen and the second screen are made similar to each other. However, this is given not for limitation. The first screen and the second screen may have totally different screen structures.

Although the embodiment of the present invention has been described and illustrated in detail, the disclosed embodiments are made for purposes of illustration and example only and not limitation. The scope of the present invention should be interpreted by terms of the appended claims.

What is claimed is:

1. An image processing device that provides an operation terminal device with an operation screen and receives input information from said operation terminal device, said image processing device comprising a hardware processor that:
communicates with said operation terminal device in one of a first communication mode and a second communication mode, which is different from said first communication mode;
determines whether the communication with said operation terminal device is in said first communication mode or said second communication mode; and
creates a first screen, which is an operation screen imposed with no limit, and provides said operation terminal device with said created first screen when the communication is determined to be made in said first communication mode, and creates a second screen, which is an operation screen imposed with a limit, and provides said operation terminal device with said created second screen when the communication is determined to be made in said second communication mode, wherein said hardware processor disables a series of inputs when switching of the communication mode from said first communication mode to said second communication mode is detected while said series of inputs on said first screen is received.

2. The image processing device according to claim 1, wherein said first communication mode has higher security than said second communication mode.

3. The image processing device according to claim 1, wherein:
communication in said first communication mode is made by wired communication; and
communication in said second communication mode is made by wireless communication.

4. The image processing device according to claim 1, wherein:
communication in said first communication mode is made by encrypted communication; and
communication in said second communication mode is made by non-encrypted communication.

5. The image processing device according to claim 1, wherein:
both said first communication mode and said second communication mode are made by encrypted communication; and
an encryption strength of said first communication mode is higher than the second communication mode.

6. The image processing device according to claim 1, wherein said hardware processor determines a communication protocol used for the communication with said operation terminal device, thereby determining whether the communication is made in either said first communication mode or said second communication mode.

7. The image processing device according to claim 1, wherein said hardware processor further receives an input on said first screen based on input information received from said operation terminal device while said first screen is provided to said operation terminal device, and does not receive the input on said second screen while said second screen is provided to said operation terminal device.

8. The image processing device according to claim 1, wherein said hardware processor switches the operation screen to provide to said operation terminal device from said first screen to said second screen in a manner that the input made on said first screen is stored when switching of the communication mode from said first communication mode to said second communication mode is detected while said first screen is provided to said operation terminal device, and said first screen to which said stored input is applied is provided to said operation terminal device when switching of the communication mode from said second communication mode to said first communication mode is detected.

9. The image processing device according to claim 1, wherein:
said first screen allows transmission and receipt of confidential information between said image processing device and said operation terminal device, and said second screen does not allow transmission and receipt of the confidential information between said image processing device and said operation terminal device.

10. The image processing device according to claim 1, further comprising a display device capable of communicating with said hardware processor in said first communication mode,
wherein said hardware processor provides said display device with said first screen when providing with said operation screen, and provides said operation terminal device with either said first screen or said second screen based on the determination result when providing with said operation screen.

11. An image processing system, comprising:
an image processing device according to claim 1; and
an operation terminal device capable of communicating with said image processing device in said first communication mode or said second communication mode,
wherein said operation terminal device includes:
a display on which a first screen or a second screen provided by said image processing device is displayed; and
a hardware processor that:
detects a user input; and
transmits input information every time a single input is detected while said first screen is displayed on said display, and stores the detected input while said second screen is displayed on said display and transmits the input information based on the stored input at a time when the screen displayed on said display is switched to said first screen from said second screen.

12. A non-transitory recording medium storing a computer readable program which, when executed by a hardware processor in an image processing device that provides an operation terminal device with an operation screen and receives input information from said operation terminal device, controls said hardware processor in said image processing device to perform operations of:
communicating with said operation terminal device in one of a first communication mode and a second communication mode, which is different from said first communication mode;
determining whether the communication with said operation terminal device is in said first communication mode or said second communication mode; and
creating a first screen, which is an operation screen imposed with no limit, and providing said operation terminal device with said created first screen when the communication is determined to be made in said first communication mode, creating a second screen, which is an operation screen imposed with a limit, and providing said operation terminal device with said created second screen when the communication is determined to be made in said second communication mode, and
disabling a series of inputs when switching of the communication mode from said first communication mode to said second communication mode is detected while said series of inputs on said first screen is received.

13. The non-transitory recording medium according to claim 12, wherein said first communication mode has higher security than said second communication mode.

14. The non-transitory recording medium according to claim 12, wherein:
communication in said first communication mode is made by wired communication; and
communication in said second communication mode is made by wireless communication.

15. The non-transitory recording medium according to claim 12, wherein:

communication in said first communication mode is made by encrypted communication; and communication in said second communication mode is made by non-encrypted communication.

16. The non-transitory recording medium according to claim 12, wherein:

both said first communication mode and said second communication mode are made in encrypted communication; and an encryption strength of said first communication mode is higher than the second communication mode.

17. The non-transitory recording medium according to claim 12, wherein a communication protocol used for the communication with said operation terminal device is determined so that whether the communication is made in either said first communication mode or said second communication mode is determined.

18. The non-transitory recording medium according to claim 12, wherein the program further controls the hardware processor to perform:

receiving an input on said first screen based on input information received from said operation terminal device while said first screen is provided to said operation terminal device, wherein the input on said second screen is not received while said second screen is provided to said operation terminal device.

19. The non-transitory recording medium according to claim 12, wherein the program further controls the hardware processor to switch the operation screen to be provided to said operation terminal device from said first screen to said second screen in a manner that the input made on said first screen is stored when switching of the communication mode from said first communication mode to said second communication mode is detected while said first screen is provided to said operation terminal device, and said first screen to which said stored input is applied is provided to said operation terminal device when switching of the communication mode from said second communication mode to said first communication mode is detected.

20. The non-transitory recording medium according to claim 12, wherein said first screen allows transmission and receipt of confidential information between said image processing device and said operation terminal device, and said second screen does not allow transmission and receipt of the confidential information between said image processing device and said operation terminal device.

21. The non-transitory recording medium according to claim 12, wherein:

said image processing device comprises a display device capable of communicating with said hardware processor in said first communication mode, and the program further controls the hardware processor to provide said display device with said first screen when the operation screen is provided, and provide said operation terminal device with either said first screen or said second screen based on the determination result when the operation screen is provided.

* * * * *